(12) United States Patent
Behrooz

(10) Patent No.: US 11,302,008 B2
(45) Date of Patent: Apr. 12, 2022

(54) SYSTEMS AND METHODS FOR AUTOMATED DETECTION AND SEGMENTATION OF VERTEBRAL CENTRUM(S) IN 3D IMAGES

(71) Applicant: PerkinElmer Health Sciences, Inc., Waltham, MA (US)

(72) Inventor: Ali Behrooz, Waltham, MA (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 0 days.

(21) Appl. No.: 16/339,923

(22) PCT Filed: Mar. 30, 2018

(86) PCT No.: PCT/US2018/025383
§ 371 (c)(1),
(2) Date: Apr. 5, 2019

(87) PCT Pub. No.: WO2019/190548
PCT Pub. Date: Oct. 3, 2019

(65) Prior Publication Data
US 2021/0358128 A1 Nov. 18, 2021

(51) Int. Cl.
*G06T 7/11* (2017.01)
*G06T 7/155* (2017.01)
*G06T 5/30* (2006.01)

(52) U.S. Cl.
CPC .............. *G06T 7/11* (2017.01); *G06T 5/30* (2013.01); *G06T 7/155* (2017.01); *G06T 2207/10081* (2013.01); *G06T 2207/20041* (2013.01); *G06T 2207/20152* (2013.01); *G06T 2207/30012* (2013.01)

(58) Field of Classification Search
CPC ... G06T 7/11; G06T 5/30; G06T 7/155; G06T 2207/10081; G06T 2207/20041; G06T 2207/20152; G06T 2207/30012
See application file for complete search history.

(56) References Cited

U.S. PATENT DOCUMENTS

2009/0226060 A1* 9/2009 Gering ................... G06T 7/11
382/128
2010/0128953 A1* 5/2010 Ostrovsky-Berman ...................
G06T 7/344
382/131

(Continued)

OTHER PUBLICATIONS

Sep. 6, 2021 (EP)—Extended European Search Report Application No. 18913179.0.

(Continued)

*Primary Examiner* — Christopher M Brandt
(74) *Attorney, Agent, or Firm* — Banner & Witcoff, Ltd.

(57) ABSTRACT

Presented herein are systems and methods that allow for vertebral centrums of individual vertebrae to be identified and segmented within a 3D image of a subject (e.g., a CT or microCT image). In certain embodiments, the approaches described herein identify, within a graphical representation of an individual vertebra in a 3D image of a subject, multiple discrete and differentiable regions, one of which corresponds to a vertebral centrum of the individual vertebra. The region corresponding to the vertebral centrum may be automatically or manually (e.g., via a user interaction) classified as such. Identifying vertebral centrums in this manner facilitates streamlined quantitative analysis of 3D images for osteological research, notably, providing a basis for rapid and consistent evaluation of vertebral centrum morphometric attributes.

20 Claims, 12 Drawing Sheets

(56) References Cited

U.S. PATENT DOCUMENTS

| | | |
|---|---|---|
| 2014/0064583 A1 | 3/2014 | Wang et al. |
| 2014/0161334 A1* | 6/2014 | Wang .................. G06T 7/12 |
| | | 382/131 |
| 2017/0032518 A1 | 2/2017 | Behrooz et al. |
| 2017/0091919 A1 | 3/2017 | Karino |

OTHER PUBLICATIONS

Mastmeyer et al. "A hierarchical 3D segmentation method and the definition of vertebral body coordinate systems for QCT of the lumbar spine". Medical Image Analysis 10 (2006) 560-577.

Donohue et al. "Pleural effusion segmentation in thin-slice CT" Medical imaging 2009: Image Processing, Proc. of SPIE vol. 7529, 2009, pp. 725931-1-12.

Russ, John. "Processing Binary Images". Jan. 1, 2007, The Image Processing Handbook, CRC/Taylor & Francis, Boca Raton, FL, pp. 443-509.

Xue, Xinwei. "Interactive 3D Heart Chamber Partitioning with a New Marker-Controlled Watershed Algorithm". Jan. 1, 2005, Advances in Visual Computing Lecture Notes in Computer Science: LNCS, Springer, Berlin, DE, pp. 92-99.

Dec. 6, 2006. Naegel, Benoit. "Using mathematical morphology for the anatomical labeling of vertebrae from 30 CT-scan images." Computerized Medical Imaging and Graphics 31.3 (2007): 141-156.

Jun. 26, 2018—ISR & WO—PCT/US18/25383.

* cited by examiner

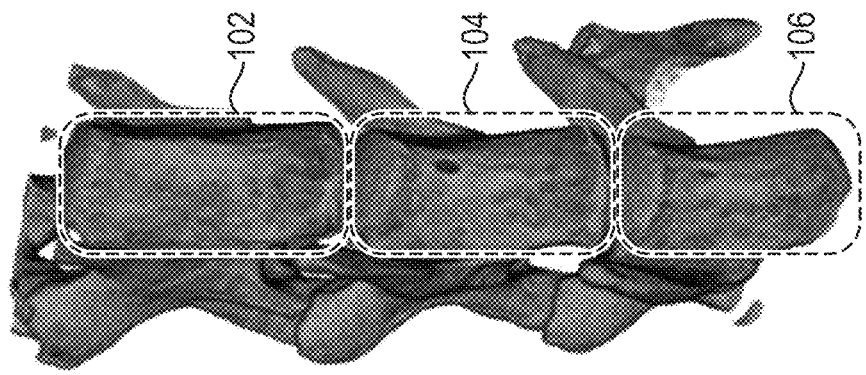
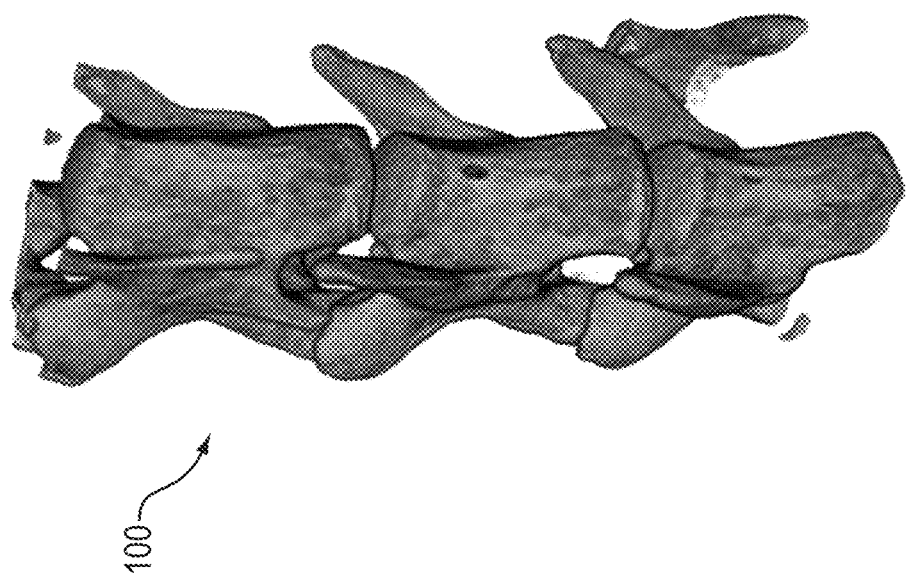

SYSTEMS AND METHODS FOR AUTOMATED DETECTION AND SEGMENTATION OF VERTEBRAL CENTRUM(S) IN 3D IMAGES

RELATED APPLICATION DATA

This application is a National Stage Application under 35 U.S.C. 371 of co-pending PCT application number PCT/US2018/025383 designating the United States and filed Mar. 30, 2018; which is incorporated herein by reference in its entirety.

FIELD OF THE INVENTION

This invention relates generally to methods and systems of image processing and analysis. More particularly, in certain embodiments, the invention relates to automatic detection and/or segmentation of vertebral centrum(s) in an anatomical image of a small subject (e.g., small animal; e.g., small mammal), e.g., captured with a computed tomography (CT) scanner.

BACKGROUND OF THE INVENTION

There is a wide array of technologies directed to in vivo imaging of mammals—for example, bioluminescence, fluorescence, tomography, and multimodal imaging technologies. In vivo imaging of small mammals is performed by a large community of investigators in various fields, e.g., oncology, infectious disease, and drug discovery.

In vivo micro computed tomography (hereafter, "microCT") imaging, is an x-ray-based technology that can image tissues, organs, and non-organic structures with high resolution, although higher-throughput imaging may make beneficial use of lower resolution microCT imaging to speed image acquisition and/or processing while maintaining acceptable accuracy and image detail. MicroCT has evolved quickly, requiring low dose scanning and fast imaging protocols to facilitate multi-modal applications and enable longitudinal experimental models. In vivo imaging often involves the use of reagents, such as fluorescent probes, for non-invasive spatiotemporal visualization of biological phenomena inside a live animal. Multi-modal imaging involves the fusion of images obtained in different ways, for example, by combining FMT, PET, MRI, CT, and/or SPECT imaging data.

Image analysis applications and/or imaging systems generally allow for visualization, analysis, processing, segmentation, registration, and measurement of biomedical images. These applications and systems also provide volume rendering tools (e.g., volumetric compositing, depth shading, gradient shading, maximum intensity projection, summed voxel projection, signal projection); manipulation functions (e.g., to define areas of structures of interest, delete unwanted objects, edit images and object maps); and measurement functions (e.g., for calculation of number of surface voxels, number of exposed faces, planar area of a region, and estimated surface area or volume of a region).

Image segmentation techniques are often used to identify separate regions of images that correspond to different structures, organs, and/or tissue of interest. Where different structures of interest are similar in nature and/or found in close proximity to each other, accurate and robust image segmentation can be challenging. In particular, while segmenting representations of individual bones (e.g., to differentiate between individual bones) is sufficiently difficult in and of itself, further segmentation of individual bones in order to differentiate between their various sub-regions can present even greater challenges. For example, while individual bones are naturally physically separated from each other at joints, physical structural divisions between various sub-regions of specific bones are often not clearly discernable. Further segmenting individual bones in this manner (e.g., to differentiate between various sub-regions of a specific bone), however, is valuable for imaging approaches directed to the study and/or diagnosis of bone formation, injury, and disease.

For example, osteological research often involves quantitative analysis of bone morphometric attributes. Studies focusing on vertebral bone formation, spine injuries, and diseases such as degenerative disc disease and osteoporosis measure morphometric attributes of vertebrae and specific sub-regions thereof in in order to gauge, for example, disease state and/or progression, injury severity, and the like. Measurement and analysis of vertebrae morphometric attributes typically focus on a specific portion of each vertebra, referred to as the vertebral centrum or vertebral body. The vertebral centrum is a thick oval-shaped central portion of an individual vertebra, comprising cancellous bone tissue encircled by a protective layer of compact bone, which forms a cortical compartment. Structures referred to as pedicles protrude from each side of the vertebral centrum and join with laminae to form a vertebral arch. Vertebral centrums are major load bearing structures in vertebrae and are prone to developing compression fractures, particularly in patients with degenerative diseases such as osteoporosis. Accordingly, measurement and analysis of vertebral centrum regions of vertebrae are especially significant for osteological research and/or diagnosis.

Ex vivo and/or in vivo measurements of bone morphometric attributes are often obtained using microCT imaging, which provides sufficient contrast between bone and soft-tissue. An example microCT image of several vertebrae is shown in FIG. 1A and FIG. 1B. In FIG. 1B, the vertebral centrums of each of three vertebrae are manually identified. Analysis of microCT images to measure morphometric attributes of vertebral centrum(s) can provide insight useful for developing understanding of disease and/or injury diagnosis, state, and progression in a subject, as well as analysis of efficacy of different treatments. However, heretofore, image-based analysis of vertebrae morphometric attributes have relied on manual identification of vertebral centrums (e.g., via hand-drawn boundaries drawn by a user, as shown in FIG. 1B).

Accordingly, there exists a need for improved systems and methods for automated segmentation of individual bones into their various constituent sub-regions. In particular, there exists a need for systems and methods that can automatically identify vertebral centrums of individual vertebrae.

SUMMARY OF THE INVENTION

Presented herein are systems and methods that allow for vertebral centrums of individual vertebrae to be identified and segmented within a 3D image of a subject (e.g., a CT or microCT image). In certain embodiments, the approaches described herein identify, within a graphical representation of an individual vertebra in a 3D image of a subject, multiple discrete and differentiable regions, one of which corresponds to a vertebral centrum of the individual vertebra. The region corresponding to the vertebral centrum may be automatically or manually (e.g., via a user interaction) classified as such. Identifying vertebral centrums in this manner facilitates streamlined quantitative analysis of 3D images for osteological research, notably, providing a basis for rapid and consistent evaluation of vertebral centrum morphometric attributes.

In certain embodiments, to provide for accurate and robust identification and segmentation of vertebral centrum regions of images, the approaches described herein utilize a series of image processing steps that account for and leverage insight about the specific physical structure of individual vertebrae and vertebral centrums thereof.

In certain embodiments, a single vertebra mask that identifies a portion of a 3D image that corresponds to particular individual vertebra of interest is first accessed and/or generated. A series of specific image processing steps are then applied to this single vertebra mask to separate out a vertebral centrum sub-region that corresponds to the vertebral centrum of the vertebra of interest. The specific image processing steps used leverage insight regarding the specific physical geometry of vertebrae and the manner in which the vertebral centrum is physically differentiated from the other regions of individual vertebrae. The approaches herein include steps that not only take advantage of the manner in which these physical features are represented in images to provide for segmentation, but also address sources of severe errors that result from image features that correspond to certain physical structures of vertebrae.

In particular, FIG. 2A and FIG. 2B show external and cross sectional views of individual vertebra. As described herein, and shown in FIG. 2A, externally, the vertebral centrum appears to be a thick, oval-shaped solid bone structure, from which narrower pedicles protrude. A combination of distance transform and subsequent watershed segmentation operations can be used to sub-divide graphical representations, such as masks, at points where they narrow. Accordingly, such a combination of steps offers potential to separate the vertebral centrum region from other regions of a single vertebra mask based on the apparent thickness of the vertebral centrum in comparison with the narrower connecting regions that join it to other parts of the vertebra.

However, as shown in FIG. 2A and FIG. 2B, while the vertebral centrum 202 appears solid externally, its interior (e.g., trabecular portion) 252 (not to be confused with the neural canal 204) comprises fine structure and cavities occupied by marrow and soft-tissue. Accordingly, in certain embodiments, single vertebra masks generated from 3D images to identify individual vertebrae have a hollow, shell-like structures that represent image regions that correspond to solid bone, with regions corresponding to soft-tissue and marrow are typically omitted. Additionally, single vertebra masks often include perforations that run between the interior (e.g., cavity corresponding to a marrow and/or soft-tissue region) and exterior of the mask. These perforations correspond physically to common physical structures, such as blood vessels within bones, as well as other physical structures, such as tumors and/or cracks. Features such as tumors and cracks, though less common in general, may be present in vertebrae of subjects imaged for osteological applications related to analysis and/or diagnosis of certain diseases or injuries.

In certain embodiments, the hollow cavities and/or perforations in single vertebra masks prevent the above described distance transform and watershed segmentation operations from accurately and robustly detecting and segmenting the vertebral centrum region of a single vertebra mask. In particular, perforations and hollow regions within a single vertebra mask can create numerous narrow regions within the vertebral centrum region itself. With numerous narrow features within the vertebral centrum region itself, the narrow connections that also exist between the vertebral centrum and other vertebra regions fail to provide specificity for separating between the vertebral centrum and other regions. Accordingly, distance transform and watershed segmentation operations applied to such as mask can produce significant over-segmentation errors, indistinguishably sub-dividing the single vertebra mask at narrow features within the vertebral centrum region in addition to at its connections to other regions.

Accordingly, in certain embodiments, in order to address this challenge, the vertebral centrum segmentation approaches described herein utilize a filling step that artificially fills in regions of a single vertebra mask that correspond to perforations and interior (e.g., trabecular) regions, such as region 252 in FIG. 2B. This approach transforms the individual single vertebral mask from a shell-like structure to a solid structure—a filled single vertebra mask. Applying the distance transform and watershed segmentation steps to the filled single vertebra mask, as opposed to the initial single vertebra mask, allows them to successfully take advantage of the narrow connections between the vertebral centrum and other regions of the individual vertebra to accurately and robustly detect and segment the vertebral centrum region. Including such a filling step prior to performing the distance transform and watershed segmentation steps thus accounts for the unique physical geometry of vertebrae and avoids over-segmentation errors that would otherwise result from the hollow and/or perforated initially obtained (e.g., generated; e.g., accessed) single vertebra mask.

In certain embodiments, identified vertebral centrum regions can be used to perform quantitative measurements of volume, surface (e.g., surface area), connectivity, and other morphometric attributes of trabecular and cortical compartments of vertebral centrums of vertebrae. Such measurements serve as valuable metrics for, for example, assessing disease state in a subject and may be performed repeatedly over time to evaluate disease progression and treatment efficacies. For example, automated quantification of trabecular volume in longitudinal studies can provide insight into efficacy of different treatments for vertebral osteoporosis.

Notably, previous approaches for measurements of morphometric attributes that rely on manual identification of vertebral centrums, for example via hand-drawn boundaries as shown in FIG. 1B, are cumbersome and prone to human error and inconsistency. In contrast, by automatically identifying vertebral centrum sub-regions, which, at most need to merely be classified [e.g., via a single 'affirmative' click (e.g., as a mouse based interface) or tap (e.g., via a touch-sensitive interface)] by a user, the systems and methods provided herein dramatically streamline image analysis, allowing for more accurate and consistent analysis to be performed rapidly. By improving the accuracy and rate of analysis in this manner, the systems and methods described herein provide a valuable tool for osteological research and diagnosis.

In one aspect, the invention is directed to a method for automatically detecting and segmenting a vertebral centrum of a particular vertebra in a 3D image of a subject (e.g., an anatomical image of the subject), the method comprising: (a) receiving, by a processor of a computing device, a 3D image of a subject [e.g., wherein the image is an anatomical image (e.g., a CT image, e.g., a microCT image)], wherein the 3D image comprises a graphical representation of one or more vertebra portions of the subject; (b) accessing and/or generating, by the processor, a single vertebra mask that identifies a portion of the graphical representation determined as corresponding to the particular vertebra [e.g., wherein the single vertebra mask is a binary mask comprising a plurality of voxels, each single vertebra mask voxel corresponding to a voxel of the received 3D image, wherein single vertebra mask voxels identified as corresponding to the particular vertebra are assigned a first value (e.g., a numeric 1; e.g., a Boolean 'true') and other voxels (e.g., identified as not corresponding to the particular vertebra) are assigned a second value (e.g., numeric 0; e.g., Boolean 'false')]; (c) applying, by the processor, one or more morphological operations (e.g., morphological dilation; e.g., morphological hole filling; e.g., morphological erosion) to fill in perforations and/or one or more interior regions of the single vertebra mask, thereby generating a filled single vertebra mask; (d) determining, by the processor, a distance map by applying a distance transform to the filled single vertebra mask [e.g., wherein the distance map comprises a plurality of distance map voxels, each of which corresponds to a voxel of the filled single vertebra mask and has (e.g., is assigned) a distance value that represents a distance from the voxel to a nearest boundary and/or non-bone voxel (e.g., a voxel of the filled single vertebra mask having a value of 0)]; (e) applying, by the processor, a watershed segmentation operation to the distance map to identify a set of catchment basins from the distance map [e.g., by portioning the distance map into a plurality of catchment basins that are separated from each other by watershed lines; e.g., wherein the watershed segmentation operation produces a watershed mask comprising a plurality of catchment basins (e.g., each catchment basin corresponding to a connected region of voxels assigned a first value such as a numeric 1 or Boolean 'true') separated from each other by watershed lines (e.g., each watershed line corresponding to a connected line of voxels assigned a second value, such as a numeric 0 or Boolean 'true')]; (f) determining, by the processor, using the set of catchment basins and the single vertebra mask, a labeled inter-segmented vertebra map comprising a plurality of labeled regions, one of which corresponds to the vertebral centrum [e.g., the labeled inter-segmented vertebra map corresponding to a labeled version of the single vertebra mask in which portions of the single vertebra mask lying within different catchment basins of the set of catchment basins are identified (e.g., by taking a logical AND of each catchment basin of the set of catchment basins and the single vertebra mask) and labeled accordingly to distinguish them from each other]; and (g) rendering, by the processor, a graphical representation of the labeled inter-segmented vertebra map [e.g., for display to a user; e.g., wherein the graphical representation visually distinguishes differently labeled regions of the labeled vertebra map (e.g., using different colors, shadings, etc.)].

In certain embodiments, step (b) comprises segmenting, by the processor, the 3D image to generate the single vertebra mask.

In certain embodiments, step (b) comprises: segmenting, by the processor, the 3D image to generate a labeled (segmented) bone map comprising a plurality of labeled regions that differentiate portions of the graphical representation corresponding to individual bones (e.g., including, but not limited to the one or more vertebra portions; e.g., each labeled region of the labeled (segmented) bone map corresponding to a portion of the graphical representation determined as corresponding to a particular individual bone); rendering, by the processor, a graphical representation of the labeled (segmented) bone map [e.g., for display to a user; e.g., wherein the graphical representation visually distinguishes differently labeled regions of the labeled (segmented) bone map (e.g., using different colors, shadings, etc.)]; receiving, by the processor, a user selection of at least one of the plurality of labeled regions; and generating, by the processor, the single vertebra mask from the user selected labeled region.

In certain embodiments, the segmenting the 3D image comprises applying one or more second derivative splitting filters to the 3D image [e.g., applying one or more second derivative splitting filters to the image to produce a split bone mask for the image with bone boundaries removed; determining a plurality of split binary components of the split bone mask by performing one or more morphological processing operations; and performing a region growing operation using the split binary components of the split bone mask as seeds, thereby producing the labeled (segmented) bone map comprising the plurality of labeled regions that differentiate individual bones in the 3D image].

In certain embodiments, at least a portion of the single vertebra mask lies on an edge of the 3D image, and the method comprises filling an interior of the portion of the single vertebra mask lying on the edge of the 3D image.

In certain embodiments, step (c) comprises: applying, by the processor, a morphological dilation operation to grow the single vertebra mask (e.g., to fill in perforations in the single vertebra mask), thereby generating a dilated single vertebra mask; and applying, by the processor, a morphological hole filling operation to the dilated single vertebra mask to fill one or more interior regions within the dilated single vertebra mask to generate the filled single vertebra mask.

In certain embodiments, the method comprises refining the filled single vertebra mask by performing, by the processor, a morphological erosion operation (e.g., using a morphological erosion element having a size that is the same and/or approximately equal to a size of a morphological dilation element used in the morphological dilation operation).

In certain embodiments, the morphological dilation operation uses a dilation element having a preset and/or automatically determined size based on a resolution of the 3D image [e.g., such that the dilation element size corresponds to a particular physical size based on (e.g., approximately equal to; e.g., slightly larger than) one or more physical features associated with holes running from exterior to interior of vertebra bones (e.g., blood vessels within vertebra)(e.g., ranging from 100 to 240 microns along each dimension)]. In certain embodiments, the method comprises receiving, by the processor, a user input of a dilation element size value and using the user input dilation element size in the applying the morphological dilation operation (e.g., such that the user can enlarge the dilation element size to account for uncommon features such as cracks, tumors, etc. in imaged vertebrae).

In certain embodiments, the method comprises: (h) following step (g), receiving, by the processor, via a graphical user interface (GUI), a user selection of the labeled region of the inter-segmented vertebra map that corresponds to the vertebral centrum; and (i) determining, by the processor, a vertebral centrum region of the inter-segmented vertebra map, the vertebral centrum region corresponding to the user selection [e.g., (A) by labeling, by the processor, the user selected labeled region as corresponding to the vertebral centrum (e.g., and labeling, by the processor, the remaining labeled regions as corresponding to other regions of the vertebra), thereby producing a labeled vertebral centrum map (e.g., a binary map) that differentiates a region of the single vertebra mask corresponding to the vertebral centrum from other regions of the single vertebral mask; e.g., (B) by generating, by the processor, a vertebral centrum mask that identifies the labeled region selected by the user].

In certain embodiments, the method comprises determining, by the processor, one or more morphometric measurements (e.g., for diagnostic purposes; e.g., for determining treatment efficacy) using the determined vertebral centrum region.

In certain embodiments, the one or more morphometric measurements comprise measurements of one or more morphometric attributes of a trabecular and/or cortical component of the vertebral centrum (e.g., a volume of a trabecular component of the vertebral centrum).

In certain embodiments, the 3D image of the subject is a CT image (e.g., a microCT image) and the method comprises acquiring the CT image (e.g., the microCT image).

In another aspect, the invention is directed to a system for automatically detecting and segmenting a vertebral centrum of a particular vertebra in a 3D image of a subject (e.g., an anatomical image of the subject), the system comprising: a processor of a computing device; and a memory having instructions stored thereon, wherein the instructions, when executed by the processor, cause the processor to: (a) receive a 3D image of a subject [e.g., wherein the image is an anatomical image (e.g., a CT image, e.g., a microCT image)], wherein the 3D image comprises a graphical representation of one or more vertebra portions of the subject; (b) access and/or generate a single vertebra mask that identifies a portion of the graphical representation determined as corresponding to the particular vertebra [e.g., wherein the single vertebra mask is a binary mask comprising a plurality of voxels, each single vertebra mask voxel corresponding to a voxel of the received 3D image, wherein single vertebra mask voxels identified as corresponding to the particular vertebra are assigned a first value (e.g., a numeric 1; e.g., a Boolean 'true') and other voxels (e.g., identified as not corresponding to the particular vertebra) are assigned a second value (e.g., numeric 0; e.g., Boolean 'false')]; (c) apply one or more morphological operations (e.g., morphological dilation; e.g., morphological hole filling; e.g., morphological erosion) to fill in perforations and/or one or more interior regions of the single vertebra mask, thereby generating a filled single vertebra mask; (d) determine a distance map by applying a distance transform to the filled single vertebra mask [e.g., wherein the distance map comprises a plurality of distance map voxels, each of which corresponds to a voxel of the filled single vertebra mask and has (e.g., is assigned) a distance value that represents a distance from the voxel to a nearest boundary and/or non-bone voxel (e.g., a voxel of the filled single vertebra mask having a value of 0)]; (e) apply a watershed segmentation operation to the distance map to identify a set of catchment basins from the distance map [e.g., by portioning the distance map into a plurality of catchment basins that are separated from each other by watershed lines; e.g., wherein the watershed segmentation operation produces a watershed mask comprising a plurality of catchment basins (e.g., each catchment basin corresponding to a connected region of voxels assigned a first value such as a numeric 1 or Boolean 'true') separated from each other by watershed lines (e.g., each watershed line corresponding to a connected line of voxels assigned a second value, such as a numeric 0 or Boolean 'true')]; (f) determine, using the set of catchment basins and the single vertebra mask, a labeled inter-segmented vertebra map comprising a plurality of labeled regions, one of which corresponds to the vertebral centrum [e.g., the labeled inter-segmented vertebra map corresponding to a labeled version of the single vertebra mask in which portions of the single vertebra mask lying within different catchment basins of the set of catchment basins are identified (e.g., by taking a logical AND of each catchment basin of the set of catchment basins and the single vertebra mask) and labeled accordingly to distinguish them from each other]; and (g) render a graphical representation of the labeled inter-segmented vertebra map [e.g., for display to a user; e.g., wherein the graphical representation visually distinguishes differently labeled regions of the labeled vertebra map (e.g., using different colors, shadings, etc.)].

In certain embodiments, at step (b), the instructions cause the process to segment the 3D image to generate the single vertebra mask.

In certain embodiments, at step (b), the instructions cause the processor to: segment the 3D image to generate a labeled (segmented) bone map comprising a plurality of labeled regions that differentiate portions of the graphical representation corresponding to individual bones (e.g., including, but not limited to the one or more vertebra portions; e.g., each labeled region of the labeled (segmented) bone map corresponding to a portion of the graphical representation determined as corresponding to a particular individual bone); render a graphical representation of the labeled (segmented) bone map [e.g., for display to a user; e.g., wherein the graphical representation visually distinguishes differently labeled regions of the labeled (segmented) bone map (e.g., using different colors, shadings, etc.)]; receive a user selection of at least one of the plurality of labeled regions; and generate the single vertebra mask from the user selected labeled region.

In certain embodiments, the instructions cause the processor to segment the 3D image by applying one or more second derivative splitting filters to the 3D image [e.g., by: applying one or more second derivative splitting filters to the image to produce a split bone mask for the image with bone boundaries removed; determining a plurality of split binary components of the split bone mask by performing one or more morphological processing operations; and performing a region growing operation using the split binary components of the split bone mask as seeds, thereby producing the labeled (segmented) bone map comprising the plurality of labeled regions that differentiate individual bones in the 3D image].

In certain embodiments, at least a portion of the single vertebra mask lies on an edge of the 3D image, and wherein the instructions cause the processor to fill an interior of the portion of the single vertebra mask lying on the edge of the 3D image.

In certain embodiments, at step (c), the instructions cause the processor to: apply a morphological dilation operation to grow the single vertebra mask (e.g., to fill in perforations in the single vertebra mask), thereby generating a dilated single vertebra mask; and apply a morphological hole filling operation to the dilated single vertebra mask to fill one or more interior regions within the dilated single vertebra mask to generate the filled single vertebra mask.

In certain embodiments, the instructions cause the processor to refine the filled single vertebra mask by performing a morphological erosion operation (e.g., using a morphological erosion element having a size that is the same and/or approximately equal to a size of a morphological dilation element used in the morphological dilation operation).

In certain embodiments, the instructions cause the processor to perform the morphological dilation operation using a dilation element having a preset and/or automatically determined size based on a resolution of the 3D image [e.g., such that the dilation element size corresponds to a particular physical size based on (e.g., approximately equal to; e.g., slightly larger than) one or more physical features associated with holes running from exterior to interior of vertebra bones (e.g., blood vessels within vertebra)(e.g., ranging from 100 to 240 microns along each dimension)].

In certain embodiments, the instructions cause the processor to receive a user input of a dilation element size value and use the user input dilation element size in the applying the morphological dilation operation (e.g., such that the user can enlarge the dilation element size to account for uncommon features such as cracks, tumors, etc. in imaged vertebrae).

In certain embodiments, the instructions cause the processor to: (h) following step (g), receive, via a graphical user interface (GUI), a user selection of the labeled region of the inter-segmented vertebra map that corresponds to the vertebral centrum; and (i) determine a vertebral centrum region of the inter-segmented vertebra map, the vertebral centrum region corresponding to the user selection [e.g., (A) by labeling the user selected labeled region as corresponding to the vertebral centrum (e.g., and labeling the remaining labeled regions as corresponding to other regions of the vertebra), thereby producing a labeled vertebral centrum map (e.g., a binary map) that differentiates a region of the single vertebra mask corresponding to the vertebral centrum from other regions of the single vertebral mask; e.g., (B) by generating a vertebral centrum mask that identifies the labeled region selected by the user].

In certain embodiments, the instructions cause the processor to determine one or more morphometric measurements (e.g., for diagnostic purposes; e.g., for determining treatment efficacy) using the determined vertebral centrum region.

In certain embodiments, the one or more morphometric measurements comprise measurements of one or more morphometric attributes of a trabecular and/or cortical component of the vertebral centrum (e.g., a volume of a trabecular component of the vertebral centrum).

In certain embodiments, the 3D image of the subject is a CT image (e.g., a microCT image).

BRIEF DESCRIPTION OF THE FIGURES

The foregoing and other objects, aspects, features, and advantages of the present disclosure will become more apparent and better understood by referring to the following description taken in conjunction with the accompanying drawings, in which:

FIG. 1A is a gray scale microCT image of three lumbar vertebrae from a murine model.

FIG. 1B is a gray scale microCT image of three lumbar vertebrae from a murine model with volumes of interest (VOI) boundaries drawn (manually) around vertebral centrums of the three lumbar vertebrae.

Figure 2B:
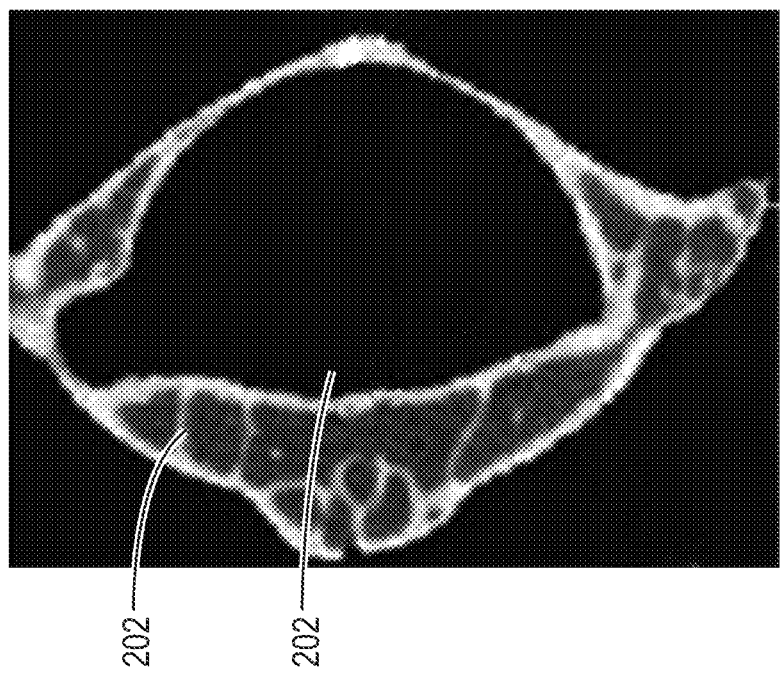
FIG. 2B is an image corresponding to an internal view of a mouse T2 vertebra [adapted from (I. A. Bab, C. Hajbi-Yonissi, Y. Gabet, and R. Müller, *Micro-Tomographic Atlas of the Mouse Skeleton*, New York, N.Y., USA. Springer, 2007; pg. 70)].

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DEFINITIONS

In this application, the use of "or" means "and/or" unless stated otherwise. As used in this application, the term "comprise" and variations of the term, such as "comprising" and "comprises," are not intended to exclude other additives, components, integers or steps. As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Image: As used herein, the term "image", for example, as in a three-dimensional image of a mammal, includes any visual representation, such as a photo, a video frame, streaming video, as well as any electronic, digital, or mathematical analogue of a photo, video frame, or streaming video. Any apparatus described herein, in certain embodiments, includes a display for displaying an image or any other result produced by a processor. Any method described herein, in certain embodiments, includes a step of displaying an image or any other result produced by the method.

3D, three-dimensional: As used herein, "3D" or "three-dimensional" with reference to an "image" means conveying information about three spatial dimensions. A 3D image may be rendered as a dataset in three dimensions and/or may be displayed as a set of two-dimensional representations, or as a three-dimensional representation. In certain embodiments, a 3-D image is represented as voxel (e.g., volumetric pixel) data.

Various medical imaging devices and other 3-D imaging devices (e.g., a computed tomography scanner (CT scanner), a microCT scanner, etc.) output 3-D images comprising voxels or otherwise have their output converted to 3-D images comprising voxels for analysis. In certain embodiments, a voxel corresponds to a unique coordinate in a 3-D image (e.g., a 3-D array). In certain embodiments, each voxel exists in either a filled or an unfilled state (e.g., binary ON or OFF).

Mask: As used herein, a "mask" is a graphical pattern that identifies a 2D or 3D region and is used to control the elimination or retention of portions of an image or other graphical pattern. In certain embodiments, a mask is represented as a binary 2-D or 3-D image, wherein each pixel of a 2-D image or each voxel of a 3-D image is assigned one of two values of a binary set of values (e.g. each pixel or voxel may be assigned a 1 or a 0, e.g. each pixel or voxel may be assigned a Boolean "true" or "false" value).

Second derivative splitting filter: As used herein, applying a "second derivative splitting filter" is an image processing operation based on the second derivatives (or approximations thereof) of the intensity of a 3D image, e.g., a grayscale 3D image, at each of a plurality of voxels. In some embodiments, a splitting filter is derived from Gaussian second derivative filters selected from Laplacian of Gaussian (LoG), highest Hessian eigenvalue with preliminary Gaussian filtering (HEH), and lowest Hessian eigenvalue with preliminary Gaussian filtering (LEH).

Split-line voxels: As used herein, the terms "split-line voxels" refer to voxels of a given image and/or mask that are identified and used to remove voxels from a particular mask, thereby splitting the particular mask.

Seed: As used herein, the term "seed" refers to a set of voxels (e.g., a connected set of voxels) that is used as an initial starting region for a growing operation that expands the size of the seed until a particular stop criteria is met. In certain embodiments, the growing operation expands the size of the seed by repeatedly adding to it neighboring voxels.

Label: As used herein, the term "label" refers to an identifier (e.g., a computer representation of an identifier, such as a textual value, a numeric value, a Boolean value, and the like) that is linked to a specific region of an image.

Subject: As used herein, the term "subject" refers to an individual that is imaged. In certain embodiments, the subject is a human. In certain embodiments, the subject is a small animal.

Small animal: As used herein, a "small animal" refers to small mammals that can be imaged with a microCT and/or micro-MR imager. In some embodiments, "small animal" refers to mice, rats, voles, rabbits, hamsters, and similarly-sized animals.

Bone, bone tissue: As used herein, the terms "bone" and "bone tissue" refer to any osseous tissue, and include, for example, both normal skeleton and heterotopic ossification (HO).

Vertebra portion(s): As used herein, the term "vertebra portion" refers to a portion of an individual vertebra, including up to all of the individual vertebra (e.g., a vertebra portion may be an entire individual vertebra).

Link: As used herein, the terms "link", and "linked", as in a first data structure or data element is linked to a second data structure or data element, refer to a computer representation of an association between two data structures or data elements that is stored electronically (e.g. in computer memory).

Provide: As used herein, the term "provide", as in "providing data", refers to a process for passing data in between different software applications, modules, systems, and/or databases. In certain embodiments, providing data comprises the execution of instructions by a process to transfer data in between software applications, or in between different modules of the same software application. In certain embodiments a software application may provide data to another application in the form of a file. In certain embodiments an application may provide data to another application on the same processor. In certain embodiments standard protocols may be used to provide data to applications on different resources. In certain embodiments a module in a software application may provide data to another module by passing arguments to that module.

DETAILED DESCRIPTION

It is contemplated that systems, architectures, devices, methods, and processes of the claimed invention encompass variations and adaptations developed using information from the embodiments described herein. Adaptation and/or modification of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Documents are incorporated herein by reference as noted. Where there is any discrepancy in the meaning of a particular term, the meaning provided in the Definition section above is controlling.

Headers are provided for the convenience of the reader— the presence and/or placement of a header is not intended to limit the scope of the subject matter described herein.

Described herein are systems and methods for detection and segmentation of graphical representations of vertebral centrums within 3D images. In certain embodiments, the systems and methods described herein provide a tool that receives a 3D image of a subject and uses a combination of image processing operations to identify regions of the 3D image that correspond to graphical representations of vertebral centrums of individual vertebrae.

In certain embodiments, the approaches described herein operate on single vertebra masks that identify individual vertebrae in order to further segment each single vertebra mask into a plurality of discrete and distinguishable subregions, including a vertebral centrum sub-region (e.g., a single vertebral centrum sub-region). In this manner, the vertebral centrum segmentation approaches described herein generate, from a single vertebra mask, a labeled intersegmented vertebra mask in an automated fashion. The labeled inter-segmented vertebra mask comprises multiple labeled regions, one of which corresponds to a vertebral centrum region. The vertebral centrum region may be classified (e.g., classified as corresponding to a vertebral centrum) automatically or may be classified manually, for example via a user interaction.

Figure 3:
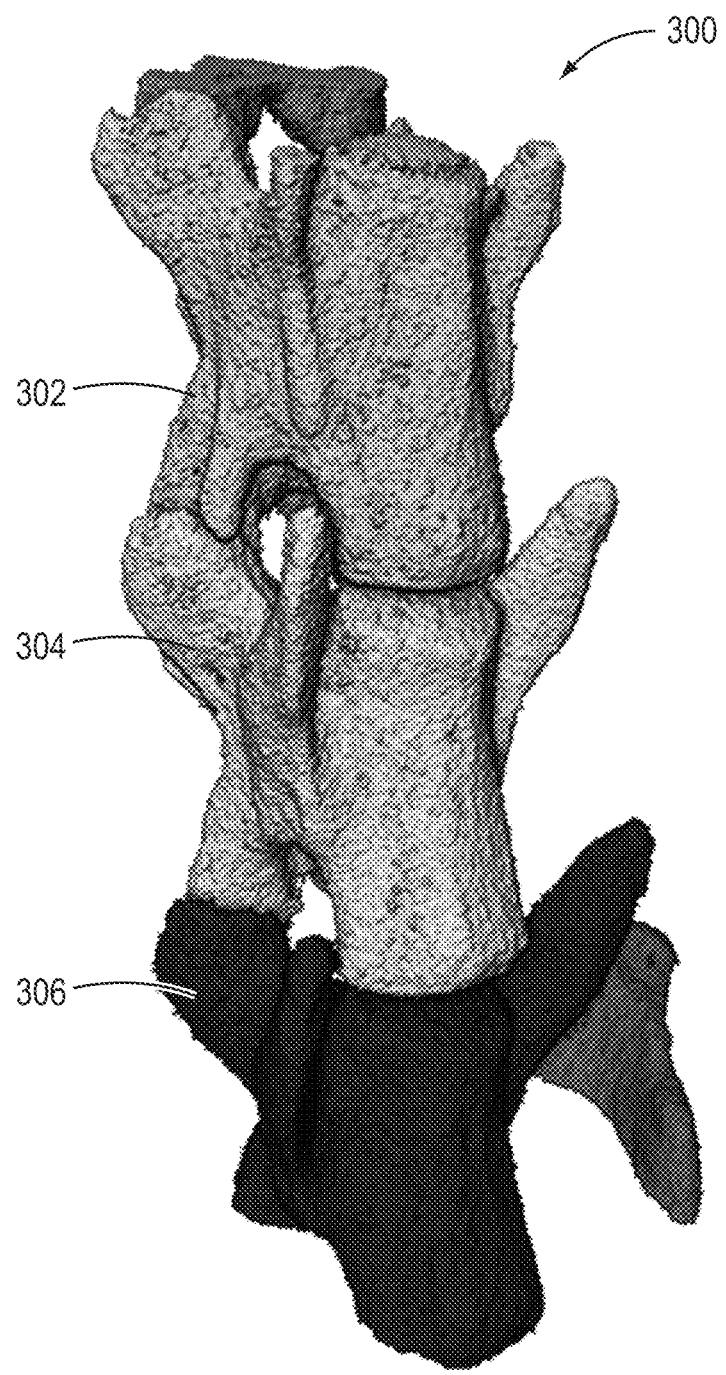
FIG. 3 is an image showing a representation of a labeled (segmented) bone map that distinguishes individual bones, including three labeled regions that identify and differentiate between three lumbar vertebrae, according to an illustrative embodiment.

For example, FIG. 3 shows a labeled (segmented) bone map 300 generated from the 3D microCT image shown in FIG. 1A and FIG. 1B. The labeled (segmented) bone map 300 comprises a plurality of labeled regions that distinguish between individual bones, including three labeled regions 302, 304, and 306 that identify and differentiate between three lumbar vertebrae. As described herein, a particular labeled region corresponding to an individual vertebra of interest may be selected and used to generate a single vertebra mask corresponding to the individual vertebra of interest.

Figure 4:
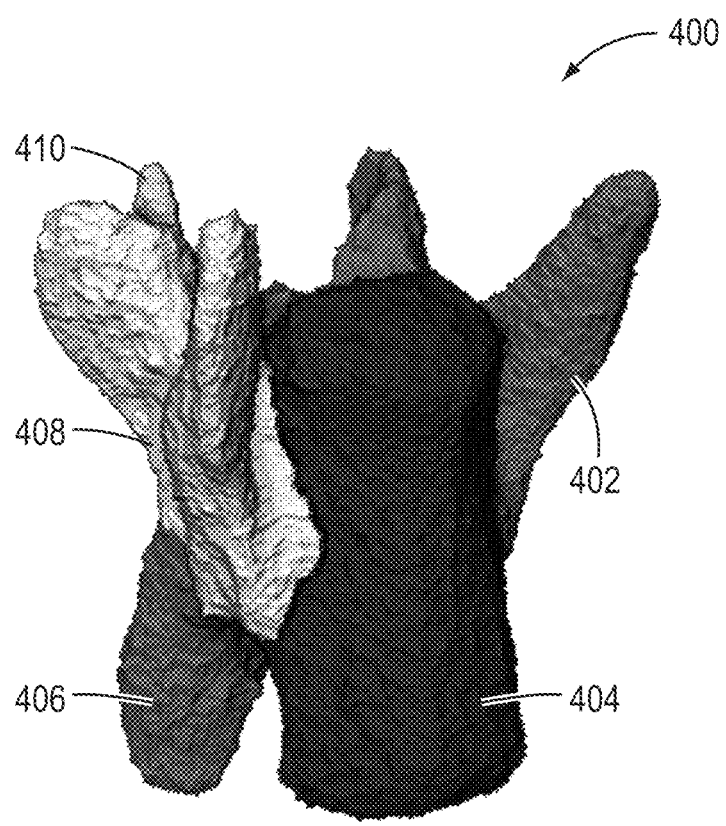
FIG. 4 is an image showing a representation of a labeled inter-segmented vertebra map determined using the approaches described herein, according to an illustrative embodiment.

The single vertebra mask is then analyzed to generate a labeled inter-segmented map that comprises a plurality of differentiable and labeled regions, one of which corresponds to the vertebral centrum of the particular vertebra of interest. FIG. 4 shows a representation of a labeled inter-segmented vertebra map 400 generated for the middle (L4) vertebra identified via region 304 for FIG. 3. The inter-segmented single vertebra map 400 includes a plurality of labeled sub-regions 402, 404, 406, 408, and 410. Sub-region 404 corresponds to the vertebral centrum. As described herein, once the labeled inter-segmented vertebra map 400 is generated, the sub-region corresponding to the vertebral centrum 404 may be classified as such, either via further automated processing or manually, via a simple streamlined user interaction such as a single 'affirmative' click on the vertebral centrum region in a representation rendered in a graphical user interface (GUI).

As described herein, ensuring generation of a labeled inter-segmented vertebra map that includes a sub-region that accurately and consistently identifies a vertebral centrum sub-region is non-trivial. In particular, the vertebral centrum segmentation approaches described herein utilize a series of image processing steps that account for and leverage insight about the specific physical structure of individual vertebrae and vertebral centrums thereof as shown, for example, in FIG. 2A and FIG. 2B.

Figure 2A:
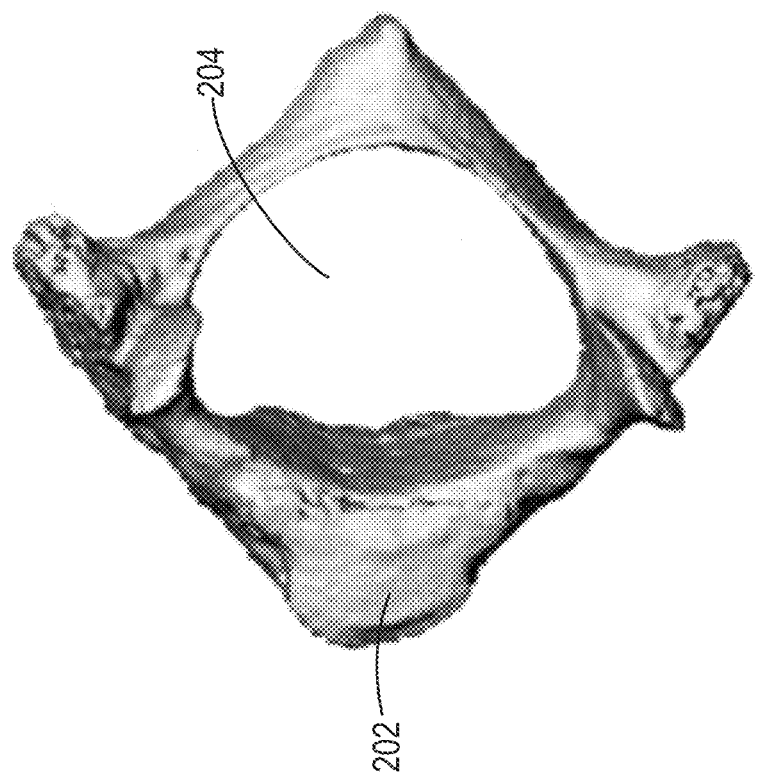
FIG. 2A is an image corresponding to a rostral view of a mouse T2 vertebra [adapted from (I. A. Bab, C. Hajbi-Yonissi, Y. Gabet, and R. Müller, *Micro-Tomographic Atlas of the Mouse Skeleton*, New York, N.Y., USA. Springer, 2007; pg. 68)].

In particular, the vertebral centrum segmentation approaches described herein utilize a filling step that artificially fills in regions of a single vertebra mask that correspond to perforations and interior (e.g., trabecular) regions, such as region 252 in FIG. 2B (not to be confused with the neural canal 204). This approach allows a vertebral centrum region 202 of a representation of an individual vertebra to be identified via distance transform and watershed segmentation steps that leverage the narrow connections (e.g., 'necks') between the vertebral centrum and other regions of the individual vertebra. As described herein, the distance transform and watershed segmentation steps provide for separation of the vertebral centrum region from the other portions of the vertebra representation via identification of these narrow connections (e.g., 'necks'), while the filling step avoids over-segmentation errors that would otherwise result due to, for example, lower densities and fine substructure of interior trabecular regions such as those shown in FIG. 2B that cause the initially obtained (e.g., accessed; e.g., generated) single vertebra masks to have hollow, shell-like structures.

In particular, the vertebral centrum segmentation approaches described herein utilize a filling step that artificially fills in regions of a single vertebra mask that correspond to perforations and interior (e.g., trabecular) regions, such as region 252 in FIG. 2B (not to be confused with the neural canal 204). This approach allows a vertebral centrum region 202 of a representation of an individual vertebra to be identified via distance transform and watershed segmentation steps that leverage the narrow connections (e.g., 'necks') between the vertebral centrum and other regions of the individual vertebra. As described herein, the distance transform and watershed segmentation steps provide for separation of the vertebral centrum region from the other portions of the vertebra representation via identification of these narrow connections (e.g., 'necks'), while the filling step avoids over-segmentation errors that would otherwise result due to, for example, lower densities and fine substructure of interior trabecular regions such as those shown in FIG. 2B that cause the initially obtained (e.g., accessed; e.g., generated) single vertebra masks to have hollow, shell-like structures.

Figure 5:
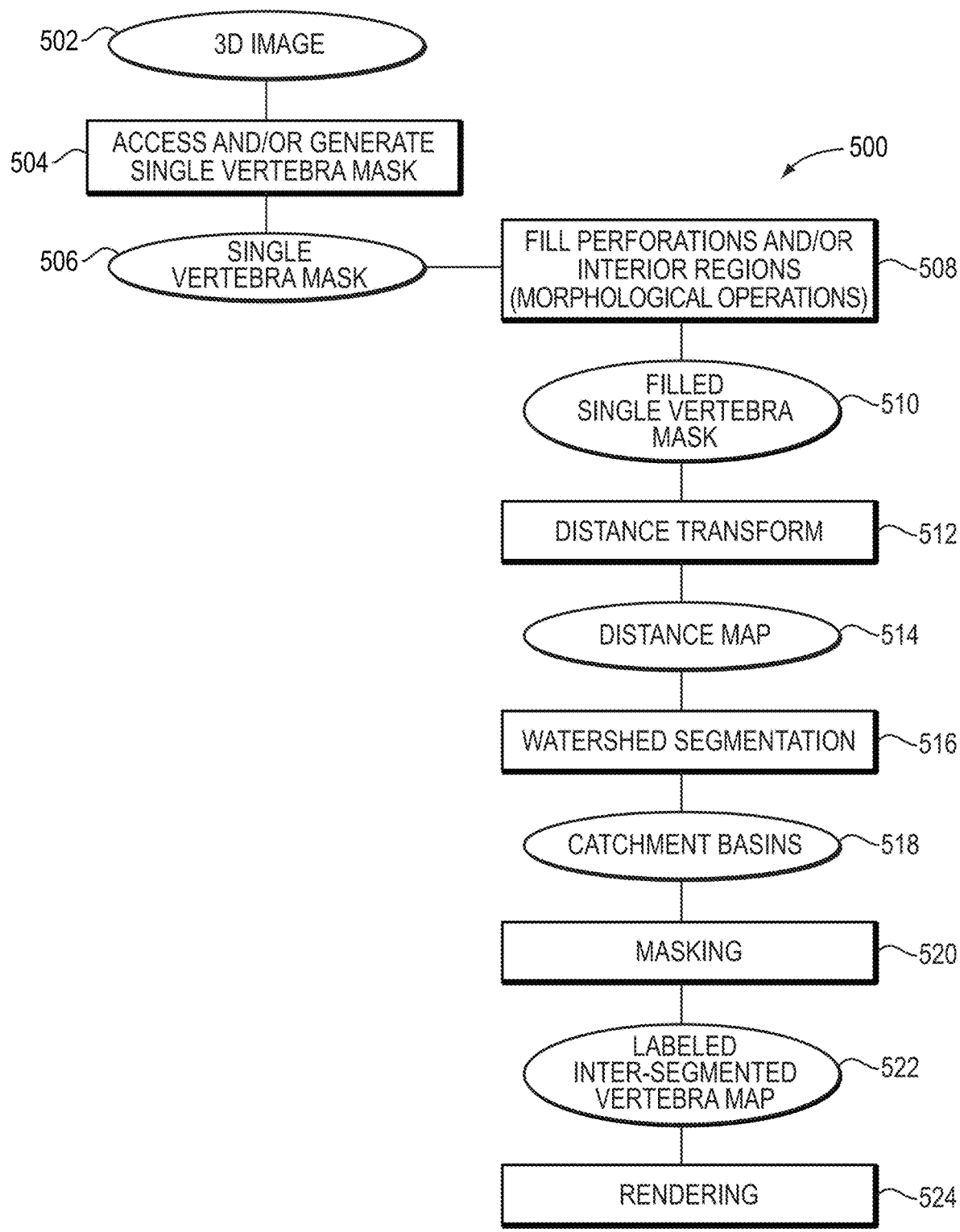
FIG. 5 is a block flow diagram of a process for automated detection and segmentation of vertebral centrums, according to an illustrative embodiment.

FIG. 5 shows an example process 500 for detecting and segmenting vertebral centrums of individual vertebra in images. The process 500 begins by receiving a 3D image of a subject 502, such as a 3D microCT image. In certain embodiments, the 3D microCT image comprises a plurality of voxels, each of which represents a specific 3D volume within a region of the imaged subject. Each voxel of the 3D image has an intensity value that provides a measure of contrast, as detected via the particular imaging modality used to obtain the 3D image. For example, voxel intensities of 3D microCT images may be represented using Hounsfield unit values, which provide a measure of attenuation that X-rays experience when passing through various regions of the subject before they are detected by an X-ray detector of the microCT detector.

In certain embodiments, the region of the subject that is imaged comprises various bones, including individual vertebra portions. Accordingly, the received 3D image comprises graphical representations of (e.g., among other things) one or more individual vertebra portions. As described herein, FIG. 1A and FIG. 1B show images of microCT images of three lumbar vertebrae of murine models. In the figures, the dark gray regions correspond to graphical representations of bone. Specific regions of the image shown in FIG. 1B corresponding to vertebral centrums of individual vertebrae, having been identified manually (e.g., via a user manually drawing on the image), are outlined in the figure.

A. Segmentation of Individual Vertebra(e) and Single Vertebra Mask(s)

Returning to FIG. 5, in another step 504, a single vertebra mask 506 is accessed and/or generated. For example, the systems and methods described herein may access and operate on an already generated single vertebra mask, which is then further segmented as described herein or may include steps to generate the single vertebra mask that is further segmented to generate the inter-segmented vertebra mask.

The single vertebra mask 506 is a mask that identifies a portion of the 3D image that is determined as corresponding to a particular vertebra of interest, the vertebral centrum of which is to be identified and segmented. For example, the single vertebra mask 506 may be a binary mask comprising a plurality of voxels, each corresponding to a voxel of the 3D image. Voxels that are identified as corresponding to the particular vertebra are assigned a first value, such as a numeric 1 or a Boolean 'true', while other voxels are assigned a second value, such as a numeric 0 or a Boolean 'false'.

In certain embodiments, the single vertebra mask 506 is an already generated single vertebra mask and step 504 comprises accessing the already generated single vertebra mask. Such a single vertebra mask may be, for example, stored in memory and accessed.

In certain embodiments, step 504 includes generating the single vertebra mask 506. A variety of approaches may be used for generating a single vertebra mask, including manual identification of the particular single vertebra of interest, such as via a user interaction wherein a user manually draws boundaries of a particular vertebra of interest.

In certain embodiments, a more streamlined and robust approach is utilized wherein individual bones (including, but not limited to individual vertebra portions) are identified within the image using an automated segmentation approach.

Figure 6:
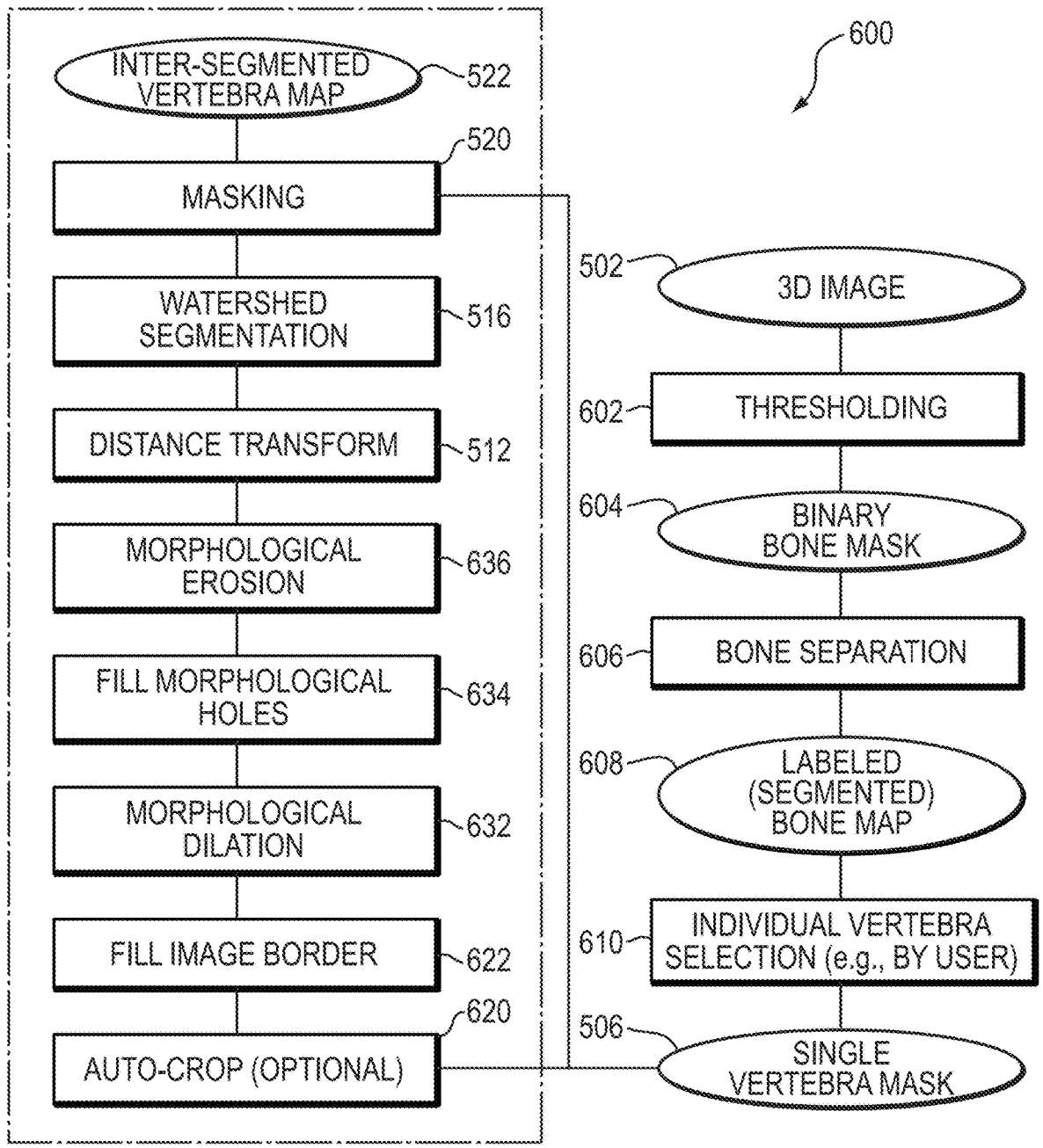
FIG. 6 is a block flow diagram of a process for automated detection and segmentation of vertebral centrums, according to an illustrative embodiment.

For example, FIG. 6 shows a specific embodiment of a process 600 for vertebral centrum detection and segmentation that includes additional steps for generating the single vertebra mask 506. The additional steps, in certain embodiments, are used to automatically segment individual bones represented in a 3D image. In the embodiment shown in FIG. 6, a thresholding operation is applied 602 to the 3D image to generate a binary bone mask 604 that identifies regions of the 3D image that correspond to bone. Voxels of the binary bone mask may, for example, be assigned a first or second value based on whether an intensity of a corresponding voxel of the 3D image 502 is above or below a particular threshold value. The thresholding operation 602 may use a same, single threshold as the particular threshold with which the intensity of each voxel of the 3D image is compared, or may select the particular threshold from multiple thresholds, such as in a hysteresis thresholding approach. In certain embodiments, when an intensity of a voxel of the 3D image is above the particular threshold, it is identified as bone and a corresponding voxel of the binary bone mask 602 is assigned the first value (e.g., a numeric 1; e.g., a Boolean 'false'), and when an intensity of a voxel of the 3D image is below the particular threshold, it is identified as not corresponding to bone and corresponding voxel of the binary bone mask 602 is assigned the second value (e.g., a numeric 0; e.g., a Boolean 'false'). Thresholding approaches for generating masks that distinguish bone voxels from non-bone voxels in 3D images are described in greater detail in U.S. patent application Ser. No. 14/812,483, filed Jul. 29, 2015; PCT Application PCT/US15/42631, filed Jul. 29, 2015; and U.S. patent application Ser. No. 15/604,350, filed May 24, 2017, the contents of each of which are hereby incorporated by reference in their entirety.

The binary bone mask 604 may then be split into multiple regions, each corresponding to a different individual bone, via a bone separation step 606. The different regions may be distinguishably labeled to generate a labeled (segmented) bone map 608 that differentiates between regions of the graphical representation that correspond to different individual bones.

In certain embodiments, the bone separation step 606 comprises applying one or more second derivative filters to the 3D image, for example as in the bone separation approach described in U.S. patent application Ser. No. 14/812,483, filed Jul. 29, 2015; and PCT Application PCT/US15/42631, filed Jul. 29, 2015. In particular, in such an approach, one or more second derivatives may be applied to the 3D image to produce a split bone mask for the image with bone boundaries removed. Morphological processing operations may be performed to determine split binary components of the split bone mask, which can then be used as seeds for a region growing operation that to produce the labeled (segmented) bone map (referred to as a "segmentation map" in U.S. patent application Ser. No. 14/812,483, filed Jul. 29, 2015; and PCT Application PCT/US15/42631, filed Jul. 29, 2015) comprising a plurality of labeled regions that differentiate individual bones in the 3D image.

Following generation of the labeled (segmented) bone map 608, a particular labeled region that corresponds to the particular individual vertebra of interest may be selected 610 and used to generate the single vertebra mask 506. The region corresponding to the particular individual vertebra may be selected automatically, or based on input from a user in a semi-automated fashion. For example, a graphical representation of the labeled (segmented) bone map may be rendered for display to the user. The differently labeled regions in the rendered graphical representation may be visually distinguished, for example via different colors, grayscale shadings, and the like. The user may then simply identify a particular region that corresponds to an individual vertebra of interest, by, for example, via a 'click' (e.g., with a mouse) or 'tap' (e.g., using a touch sensitive interface). A mask that identifies this region may then be generated and used as the single vertebra mask 506. In this manner, a user may selected a particular individual vertebra for segmentation and/or analysis via a single quick 'click' or 'tap' within a graphical user interface (GUI).

B. Detection and Segmentation of Vertebral Centrum Regions

In certain embodiments, once a single vertebra mask 506 is obtained (e.g., either accessed or generated by the systems and methods described herein), the vertebral centrum segmentation approaches described herein operate on the single vertebra mask 506 to generate a labeled inter-segmented vertebra map 522, such as the example shown in FIG. 4.

Separating a vertebral centrum region from other regions of the single vertebra mask that correspond to other portions of an individual vertebra is non-trivial. The approaches described herein include specific processing steps that both take advantage of physical features of individual vertebrae and also address image processing challenges that certain features present.

B.i Filled Single Vertebra Mask Generation

In certain embodiments, the approaches described herein comprise performing one or more morphological operations to fill in perforations and/or interior regions of the single vertebra mask 508, thereby generating a filled single vertebra mask 510. This filling step 508 addresses the image processing challenges presented by structural features of individual vertebrae, in particular their interior trabecular regions as well as blood vessels and other fine structure that run through and create openings the outer, cortical shell of the vertebral centrum.

As shown in FIG. 3A and FIG. 3B, the vertebral centrum corresponds to a cylindrical region of an individual vertebra connected to other regions of the individual vertebra by comparatively narrow structures. The interior of the vertebra, however, is not solid, dense bone, and instead comprises marrow, soft-tissue, and various other fine structure, as shown in FIG. 2B. As a result of the different densities of the outer and interior portions of vertebrae, the outer and interior portions of vertebrae are manifest as different gray-scale intensities in microCT images (e.g., the interior, soft-tissue regions having a lower intensity value, representative of less dense tissue). In turn, single vertebra masks generated from such images are not solid, but rather are shell-like, and comprise hollow interior regions (e.g., interior voxels labeled as numeric '0' or Boolean false values).

By filling these interior regions to generate a filled single vertebra mask 510, the approaches described herein transform the hollow, shell-like single vertebra mask 506 into a solid structure. Performing subsequent distance transform 512 and watershed segmentation operations 516 allows for separation of the vertebral centrum region from other sub-regions of an individual vertebra based on its relative thickness in the filled single vertebra mask in comparison with portions of the mask that join it with the other sub-regions.

Notably, distance transforms serve to identify thin structures (e.g., 'necks') in masks by determining distances from each voxel of a mask to a nearest boundary (e.g., to a nearest numeric '0' or Boolean 'false' valued voxel). Accordingly, generating a filled single vertebra mask and performing a subsequent distance transform 512 using the filled single vertebra mask avoids severe over-segmentation errors that would result were the distance transform applied instead to a hollow, shell-like single vertebra mask as initially accessed and/or generated. Such over-segmentation errors would, for example, instead of the single, easily identified vertebral centrum region 404 of the example in FIG. 4, result in a plurality of smaller, potentially ambiguous sub-regions.

In certain embodiments, the filling step 508 used to generate the filled single vertebra mask 510 is accomplished using a morphological dilation operation 632 and a morphological hole filling operation 634, as shown in the detailed example process 600 of FIG. 6. A morphological dilation 632 is performed to grow the single vertebra mask 506 and fill in perforations in it and generate a dilated single vertebra mask. Such perforations typically correspond to small holes running from the interior to the exterior of the shell-like single vertebra mask 506. These perforations result from physical structures such as blood vessels that run from the interior (e.g., marrow portion) of vertebra to the exterior. Accordingly, the morphological dilation operation 632 may use a dilation element with a size based on sizes of such physical structures, such as blood vessels, usually responsible for perforations in individual vertebra. For example, the size of the dilation element in voxels may be determined (e.g., automatically) to correspond (e.g., be approximately greater than or equal to) a particular physical size associated with blood vessels, based on a resolution of the 3D image 502. For example, for a 3D image with a resolution of approximately 20 to 30 μm along each dimension per voxel, a dilation element with a size of 5 to 8 voxels along one or more dimensions would be used (e.g., corresponding to a physical size of approximately 100 to 240 μm along one or more dimensions).

In certain embodiments, the size of the dilation element may be a user-exposed parameter, that the user can adjust themselves. This may be useful to account for certain cases where unusually large perforations are present, for example due to tumors and/or cracks in vertebrae. A user may increase or input a specific value for a size of the dilation element to account for such features.

Figure 8A:
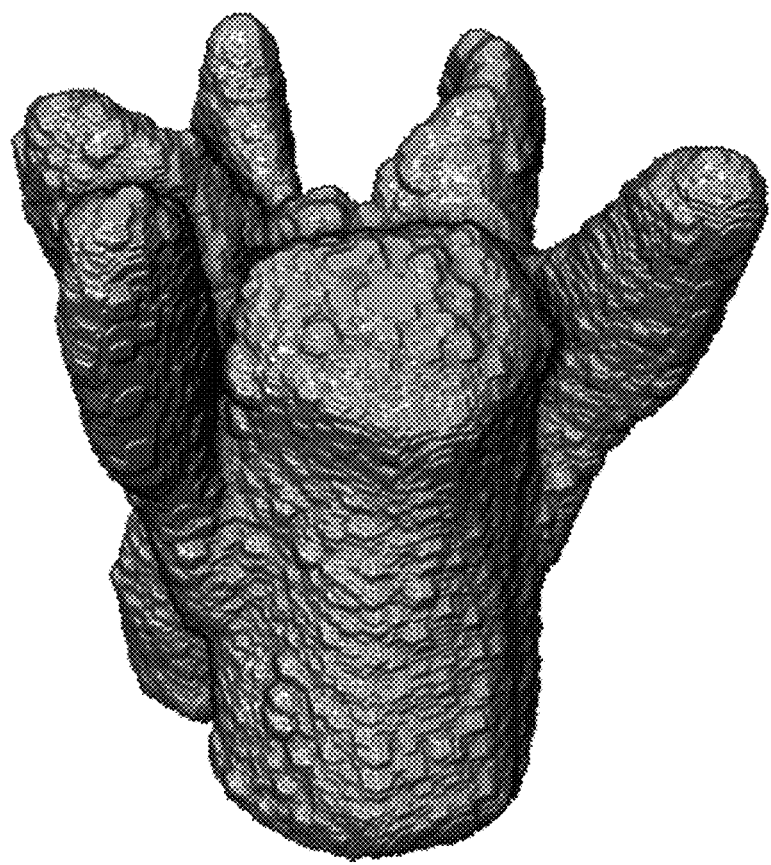
FIG. 8A is an image showing a representation of a result of applying a morphological dilation operation to a single vertebra mask, according to an illustrative embodiment.
Figure 8B:
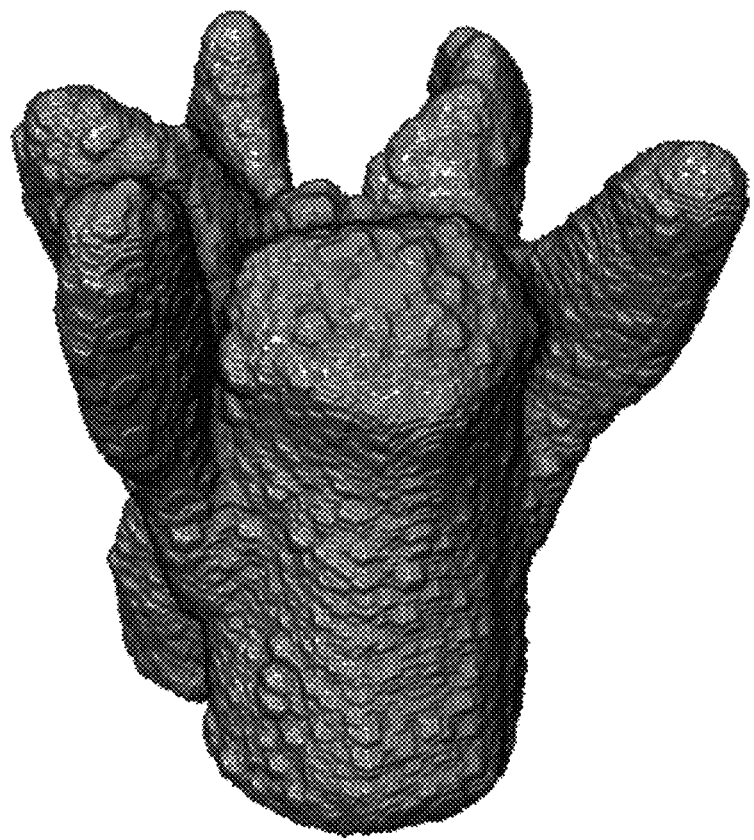
FIG. 8B is an image showing a representation of a result of applying a morphological filling operation to a single vertebra mask, according to an illustrative embodiment.

In certain embodiments, a morphological hole filling operation 634 is performed to fill in one or more interior regions in the dilated single vertebra mask generated following the morphological dilation operation 632. The morphological hole filling operation 634 thus fills in the interior regions of the single vertebra mask that correspond physically to the marrow and soft-tissue interior regions of the particular individual vertebra that it represents. In certain embodiments, it is necessary to first eliminate perforations in the single vertebra mask via the morphological dilation operation 632 prior to performing the morphological hole filling operation 634. In particular, certain morphological hole filling operations may fail when applied to masks with perforations that prevent interior regions from being well-defined. FIG. 8A shows an example dilated single vertebra mask following a morphological dilation operation, and FIG. 8B shows an example filled single vertebra mask following a morphological hole filling operation.

In certain embodiments, the filled single vertebra mask generated by applying the morphological dilation and hole filling operations is refined using a morphological erosion operation 636. Since, in addition to filling in perforations, the morphological dilation operation grows the single vertebra mask outwards, a morphological erosion operation 636 performed using an erosion element with a size that is approximately the same as that of the dilation element can be used to undo this growing effect.

Figure 7B:
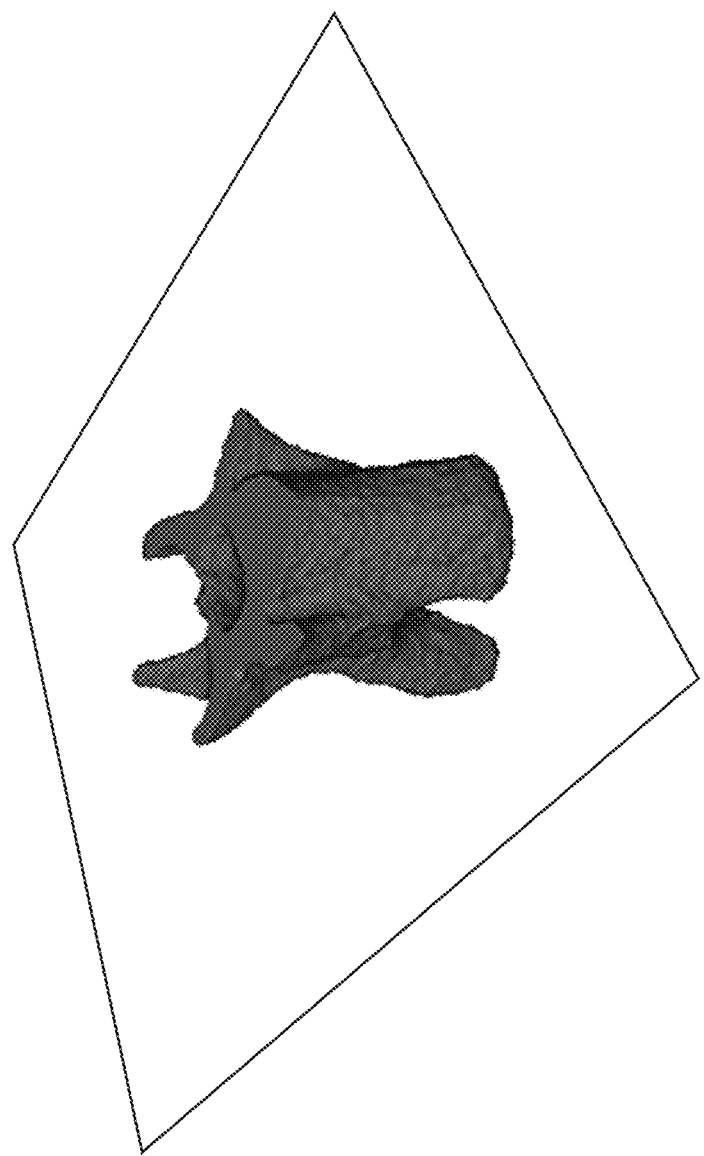
FIG. 7B is an image showing a representation of a cross-section of a filled single vertebra mask determined using the approaches described herein, according to an illustrative embodiment.
Figure 7A:
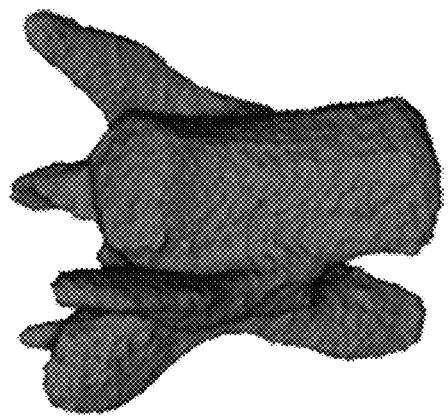
FIG. 7A is an image showing a representation of a filled single vertebra mask determined using the approaches described herein, according to an illustrative embodiment.

Accordingly, by filling in perforations and/or interior regions of the shell-like single vertebra mask 506 as described herein, a filled single vertebra mask 510 corresponding to a filled, solid object can be generated. FIG. 7A and FIG. 7B show a representation of a filled single vertebra mask generated by the example process 600 shown in FIG. 6, following the morphological erosion step 636. FIG. 7B shows a cross-sectional cut through the filled single vertebra mask shown in FIG. 7A. As shown in the figure, the interior of the single vertebra mask is solid and filled in—the single 'hole' corresponds physically to the neural canal 204 of the physical vertebra it represents. The fine structure and interior regions, such as 252 shown in FIG. 2B, of the physical individual vertebra that the filled single vertebra mask represents to are absent, having been filled in via the filling approaches described above.

In certain embodiments, additional steps are performed, for example prior to the filling step 508. For example, as shown in process 600 of FIG. 6, optional auto-crop 620 and/or fill image border 622 steps may be performed. An auto-crop step 620 crops the 3D image to the local region surrounding the single vertebra mask. Reducing the image size in this manner can, for example, increase speed of downstream processing steps. A fill image border step 622 may be included when the single vertebra mask identifies a particular individual vertebra that is partially out of view. In this case, a portion of the single vertebra mask lies on a border of the 3D image. Similar to the manner in which, in certain embodiments, perforations in the single vertebra mask need to be filled in (e.g., via a morphological dilation operation) prior to performing a morphological hole filling step, open regions in the cross-section of the single vertebra mask lying on the image border are filled via the fill image border step 622, thereby 'capping' an open end of the single vertebra mask on the image border.

B.ii Distance Transform and Distance Map Determination

In certain embodiments, process 500 comprises a step of applying a distance transform 512 to the filled single vertebra mask 510 to determine a distance map 514. The distance transform determines, for each voxel of the filled single vertebra mask corresponding to bone [e.g., assigned the first value (e.g., numeric 1; e.g., Boolean 'false')] a distance from that voxel to a nearest boundary or soft-tissue region of the 3D image [e.g., a distance to a nearest voxel of the filled single vertebra mask having the second value (e.g., numeric 0; e.g., Boolean 'false')]. The distance transform thus produces a distance map 514, which comprises a plurality of voxels, each of which corresponds to a voxel of the filled single vertebra mask 510 and has (e.g., is assigned) a distance value that represents a distance from the voxel to a nearest boundary and/or non-bone voxel (e.g., a voxel of the filled single vertebra mask having a value of 0).

Figure 9:
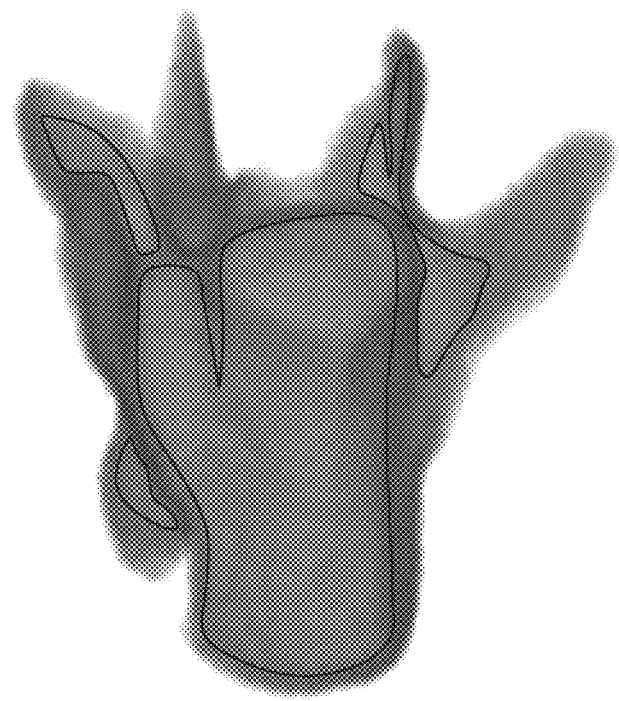
FIG. 9 is an image showing a representation of a distance map determined using the approaches described herein, according to an illustrative embodiment.

An example distance map determined by applying a distance transform to the filled single vertebra mask of FIG. 7A is shown in FIG. 9. Values of the distance map voxels are represented in gray-scale and using contour lines. Regions inside contour lines correspond to thicker regions than those outside the contour lines. Outside contour lines, shading from dark to light gray indicates decreasing thickness (e.g., decreasing distance from a boundary), with white representing 0 distance. Accordingly, the thickest regions of bone, corresponding primarily to the vertebral centrum region, are shown within the large central contour, and the thinnest regions, such as the pedicles, in the image are shown as outside the contour lines, and fading to white as distance approaches 0.

B.iii Watershed Segmentation

In certain embodiments, once the distance map is determined, a watershed segmentation step 516 applied to the distance map 514. The watershed segmentation step 516 includes a watershed segmentation operation, such as H-extrema watershed segmentation, that identifies a set of catchment basins 518 and/or watershed lines within the distance map. Catchment basins 518 of the distance map correspond to thicker regions of bone, represented by larger distance values within the distance map. Catchment basins 518 are separated from each other by watershed lines that correspond to connected lines of voxels that correspond to narrow connectors. Accordingly, the thick, solid vertebral centrum region of the filled single vertebra mask 510 is represented by one catchment basin, while regions corresponding pedicles and other structures of the particular individual vertebra that are attached to the vertebral centrum via narrow connections are represented by other catchment basins.

In certain embodiments, the watershed segmentation operation partitions the distance map into a plurality of catchment basins that are separated from each other by watershed lines. In certain embodiments, the watershed segmentation operation produces a watershed mask comprising a plurality of catchment basins (e.g., each catchment basin corresponding to a connected region of voxels assigned a first value such as a numeric 1 or Boolean 'true') separated from each other by watershed lines (e.g., each watershed line corresponding to a connected line of voxels assigned a second value, such as a numeric 0 or Boolean 'true').

B.iv Masking and Labeled Inter-Segmented Vertebra Map Generation

In certain embodiments, a masking step 520 uses the set of catchment basins 518 generated via the watershed segmentation step 516 along with the single vertebra mask 506 to generate the inter-segmented vertebra map 522. The masking step 520 comprises identifying portions of the single vertebra mask lying within different catchment basins of the set 518 and labeling them accordingly, in order to distinguish them from each other. For example, a particular portion of the single vertebra mask 506 that lies within a particular catchment basin may be identified by taking a voxel-wise logical AND between the single vertebra mask 506 and the particular catchment basin, and labeling the result [e.g., assigning each voxel having a first value (e.g., a numeric 1; e.g., a Boolean 'true') a label value (e.g., a particular integer value)]. This process may be repeated for each catchment basin of the set 518, labeling each result differently to distinguish the different regions of the single vertebra mask 506. In this manner, a labeled inter-segmented vertebra map, such as the example 400 shown in FIG. 4, is generated. As described herein, the labeled inter-segmented vertebra map 522 corresponds to a labeled version of the single vertebra mask 506 in which portions of the single vertebra mask 506 lying within different catchment basins of the set of catchment basins are identified and labeled accordingly. By virtue of the combination(s) of processing operations described herein, the vertebral centrum may be represented via a single, easily identified labeled region in the inter-segmented vertebra map.

C. Additional Processing

C.i User Interaction for Classification of Vertebral Centrum Sub-Region

In certain embodiments, once the labeled inter-segmented vertebra map 522 is generated, a graphical representation of the labeled inter-segmented vertebra map 522 is rendered 524 for presentation to a user, for example within a graphical user interface (GUI). The user may then select, via the GUI, the region corresponding to the vertebral centrum. Once the use selects, for example, which labeled region of the labeled-inter-segmented vertebra map correspond to the vertebral centrum, the region may be labeled as such (e.g., as corresponding to the vertebral centrum). This approach may be used to produce, for example, a binary labeled map that differentiates between a region of the 3D image corresponding to the vertebral centrum of the particular individual vertebra of interest and other portions of the particular individual vertebra of interest. Additionally or alternatively, a vertebral centrum mask that identifies the vertebral centrum of the particular individual vertebra of interest may be generated. Typically, as shown in the example inter-segmented vertebra map 400 in FIG. 4, the vertebral centrum is represented by a single readily identified region (404 in FIG. 4) that can be selected.

In this manner, the systems and methods described herein allow a user to identify a vertebral centrum region of a particular individual vertebra of interest represented in a 3D image by simply selecting a particular region of a displayed inter-segmented vertebra map as corresponding to a vertebral centrum. In certain embodiments, this can be accomplished via a single affirmative 'click' (e.g., with a mouse) or 'tap' (e.g., using a touch sensitive interface) within a graphical user interface (GUI). Accordingly, the vertebral centrum detection and segmentation tool described herein eliminates the cumbersome and laborious process of a user manually drawing boundaries to identify regions of an image that correspond to vertebral centrum(s) of individual vertebra(e). Moreover, because the labeled regions of the labeled inter-segmented vertebra map are automatically generated, errors and inconsistencies between different users are dramatically reduced (e.g., two or more users are almost guaranteed to select a same region(s) as corresponding to a vertebral centrum, but it is very unlikely for two or more users to draw exactly the same identical boundaries on an image).

C.ii Metric Determination

Accordingly, by providing a tool for automatically detecting and segmenting vertebral centrum(s) of individual vertebra(e) in images of a subject, the systems and methods described herein facilitate the detection and segmentation approaches described herein thereby facilitate streamlined quantitative analysis of images of vertebra(e) for applications such as osteological research and disease/injury diagnosis. In particular, the approaches described herein provide a basis for analysis of morphometric attributes, density, and structural parameters of vertebral centrum regions of individual vertebra(e). As described herein, such analysis is can provide insight useful for developing understanding of disease and/or injury diagnosis, state, and progression in a subject, as well as analysis of efficacy of different treatments.

For example, once the vertebral centrum region of the labeled inter-segmented vertebra map is identified, it can be used (e.g., as a mask) to compute one or more morphometric measurements such as a volume or surface (e.g., surface area) of the vertebral centrum. Other measurements, such as a connectivity, may also be determined. In certain embodiments, the identified vertebral centrum region is used to determine regions of the image corresponding to a trabecular and/or a cortical component of the vertebral centrum. Morphometric measurements, such as volume, surface (e.g., surface area), and the like, may thus be obtained for these specific components as well. For example, the identified vertebral centrum region may be used to determine a trabecular component sub-region corresponding to the trabecular component of the vertebral centrum. The volume of the trabecular component sub-region can be determined (e.g., automatically) to measure trabecular volume of the vertebral centrum. Automatically quantifying trabecular volume in this manner can provide insight into efficacy of different treatments for vertebral osteoporosis.

As described herein, since the vertebral centrum sub-region is generated automatically, and user interaction is limited to, at most, merely identifying (e.g., via selection) the vertebral centrum sub-region, inter and intra user errors and variations in measurements of vertebral centrum morphometric attributes are reduced dramatically. The vertebral centrum detection and segmentation approach described herein thus provides a valuable tool for assessing osteological disease state and/or progression in a subject and for assessing treatment efficacy.

C.iii Imaging Modalities

While the images presented and analyzed via the approaches described herein are microCT images, other imaging modalities may also be used. For example, the approaches described herein may also be used for detection and segmentation of vertebral centrum(s) of individual vertebra(e) in MRI images, optical images, and other types of images. In particular, the vertebral centrum segmentation and detection tool described herein may be used for analysis of any imaging modality that allows imaging of vertebral bones and osseous tissue (e.g., any modality that provides sufficient contrast between osseous tissue and soft tissue).

D. Computer Systems and Network Environment

Figure 10:
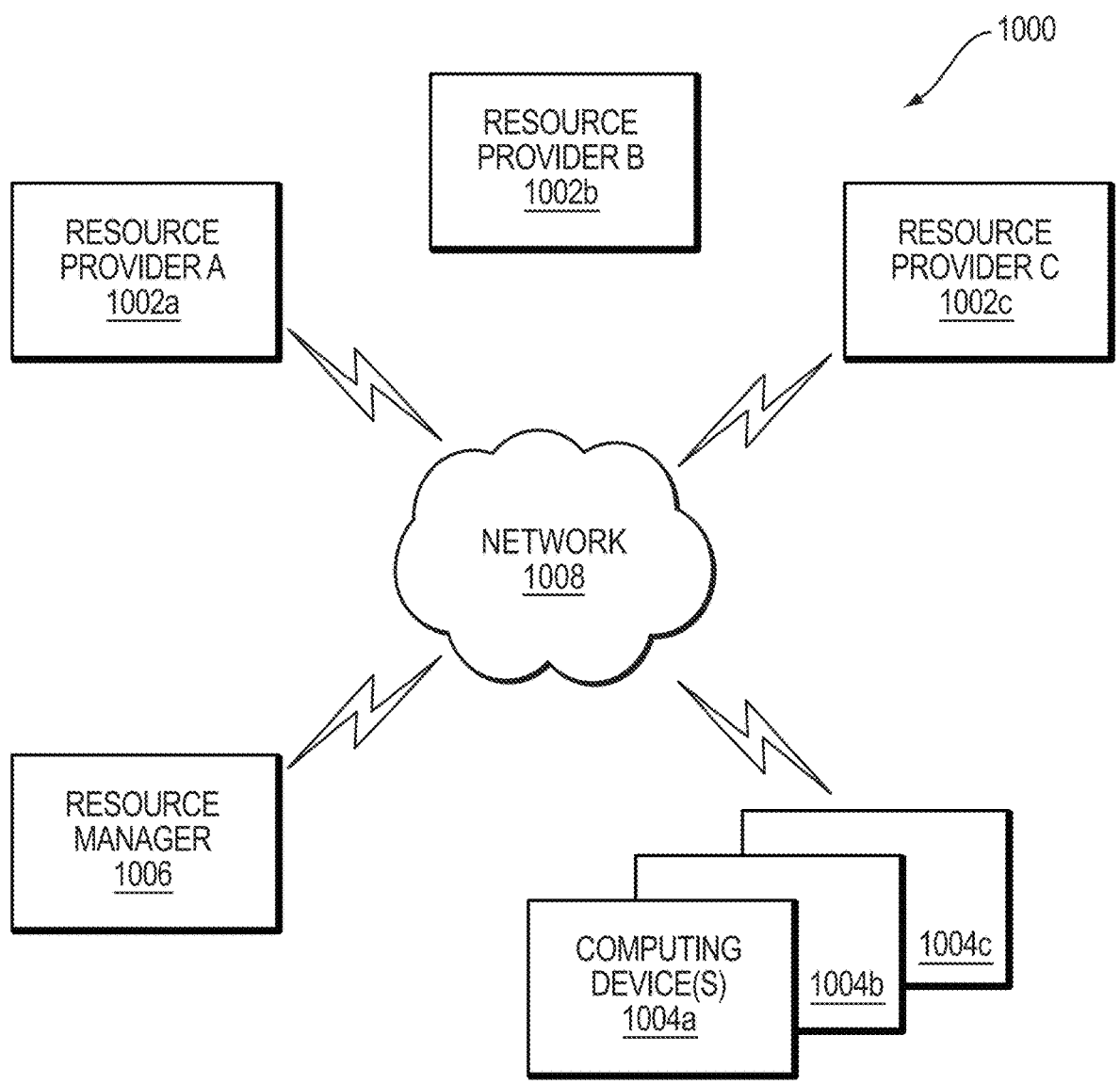
FIG. 10 is a block diagram of an exemplary cloud computing environment, used in certain embodiments.

As shown in FIG. 10, an implementation of a network environment 1000 for use in providing systems and methods for automated detection and segmentation of vertebral centrum(s) described herein is shown and described. In brief overview, referring now to FIG. 10, a block diagram of an exemplary cloud computing environment 1000 is shown and described. The cloud computing environment 1000 may include one or more resource providers 1002a, 1002b, 1002c (collectively, 1002). Each resource provider 1002 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 1002 may be connected to any other resource provider 1002 in the cloud computing environment 1000. In some implementations, the resource providers 1002 may be connected over a computer network 1008. Each resource provider 1002 may be connected to one or more computing device 1004a, 1004b, 1004c (collectively, 1004), over the computer network 1008.

The cloud computing environment 1000 may include a resource manager 1006. The resource manager 1006 may be connected to the resource providers 1002 and the computing devices 1004 over the computer network 1008. In some implementations, the resource manager 1006 may facilitate the provision of computing resources by one or more resource providers 1002 to one or more computing devices 1004. The resource manager 1006 may receive a request for a computing resource from a particular computing device 1004. The resource manager 1006 may identify one or more resource providers 1002 capable of providing the computing resource requested by the computing device 1004. The resource manager 1006 may select a resource provider 1002 to provide the computing resource. The resource manager 1006 may facilitate a connection between the resource provider 1002 and a particular computing device 1004. In some implementations, the resource manager 1006 may establish a connection between a particular resource provider 1002 and a particular computing device 1004. In some implementations, the resource manager 1006 may redirect a particular computing device 1004 to a particular resource provider 1002 with the requested computing resource.

Figure 11:
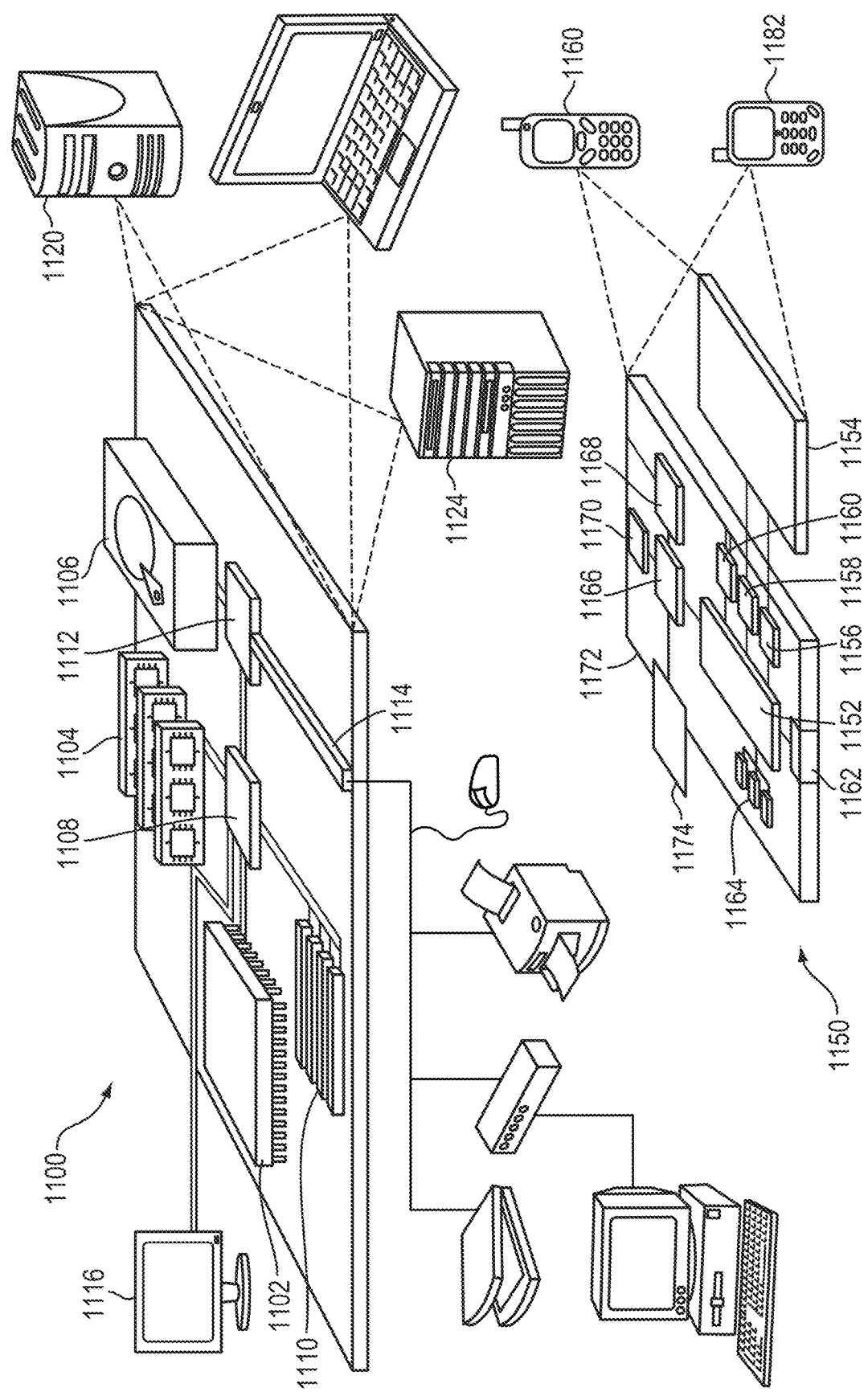
FIG. 11 is a block diagram of an example computing device and an example mobile computing device used in certain embodiments.

FIG. 11 shows an example of a computing device 1100 and a mobile computing device 1150 that can be used to implement the techniques described in this disclosure. The computing device 1100 is intended to represent various forms of digital computers, such as laptops, desktops, workstations, personal digital assistants, servers, blade servers, mainframes, and other appropriate computers. The mobile computing device 1150 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 1104 stores information within the computing device 1100. In some implementations, the memory 1104 is a volatile memory unit or units. In some implementations, the memory 1104 is a non-volatile memory unit or units. The memory 1104 may also be another form of computer-readable medium, such as a magnetic or optical disk.

The storage device 1106 is capable of providing mass storage for the computing device 1100. In some implementations, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1102), perform one or more methods, such as those described above. The instructions can also be stored by one or more storage devices such as computer- or machine-readable mediums (for example, the memory 1104, the storage device 1106, or memory on the processor 1102).

The high-speed interface 1108 manages bandwidth-intensive operations for the computing device 1100, while the low-speed interface 1112 manages lower bandwidth-intensive operations. Such allocation of functions is an example only. In some implementations, the high-speed interface 1108 is coupled to the memory 1104, the display 1116 (e.g., through a graphics processor or accelerator), and to the high-speed expansion ports 1110, which may accept various expansion cards (not shown). In the implementation, the low-speed interface 1112 is coupled to the storage device 1106 and the low-speed expansion port 1114. The low-speed expansion port 1114, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device (not shown), such as a mobile computing device 1150. Each of such devices may contain one or more of the computing device 1100 and the mobile computing device 1150, and an entire system may be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate.

The processor 1152 can execute instructions within the mobile computing device 1150, including instructions stored in the memory 1164. The processor 1152 may be implemented as a chipset of chips that include separate and multiple analog and digital processors. The processor 1152 may provide, for example, for coordination of the other components of the mobile computing device 1150, such as control of user interfaces, applications run by the mobile computing device 1150, and wireless communication by the mobile computing device 1150.

The processor 1152 may communicate with a user through a control interface 1158 and a display interface 1156 coupled to the display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a SIMM (Single In Line Memory Module) card interface. The expansion memory 1174 may provide extra storage space for the mobile computing device 1150, or may also store applications or other information for the mobile computing device 1150. Specifically, the expansion memory 1174 may include instructions to carry out or supplement the processes described above, and may include secure information also. Thus, for example, the expansion memory 1174 may be provide as a security module for the mobile computing device 1150, and may be programmed with instructions that permit secure use of the mobile computing device 1150. In addition, secure applications may be provided via the SIMM cards, along with additional information, such as placing identifying information on the SIMM card in a non-hackable manner The memory may include, for example, flash memory and/or NVRAM memory (non-volatile random access memory), as discussed below. In some implementations, instructions are stored in an information carrier. that the instructions, when executed by one or more processing devices (for example, processor 1152), perform one or more methods, such as those described above. The instructions can also be stored by one or more storage devices, such as one or more computer- or machine-readable mediums (for example, the memory 1164, the expansion memory 1174, or memory on the processor 1152). In some implementations, the instructions can be received in a propagated signal, for example, over the transceiver 1168 or the external interface 1162.

The mobile computing device 1150 may communicate wirelessly through the communication interface 1166, which may include digital signal processing circuitry where necessary. The communication interface 1166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1168 using a radio-frequency. In addition, short-range communication may occur, such as using a Bluetooth®, Wi-Fi™, or other such transceiver (not shown). In addition, a GPS (Global Positioning System) receiver module 1170 may provide additional navigation- and location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, etc.) and may also include sound generated by applications operating on the mobile computing device 1150.

The mobile computing device 1150 may be implemented in a number of different forms, as shown in the figure. For example, it may be implemented as a cellular telephone 1180. It may also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, any modules described herein can be separated, combined or incorporated into single or combined modules. The modules depicted in the figures are not intended to limit the systems described herein to the software architectures shown therein.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein.

Throughout the description, where apparatus and systems are described as having, including, or comprising specific components, or where processes and methods are described as having, including, or comprising specific steps, it is contemplated that, additionally, there are apparatus, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A system for automatically detecting and segmenting a vertebral centrum of a particular vertebra in a 3D image of a subject, the system comprising:
    a processor of a computing device; and
    a memory having instructions stored thereon, wherein the instructions, when executed by the processor, cause the processor to:
    (a) receive a 3D image of a subject, wherein the 3D image comprises a graphical representation of one or more vertebra portions of the subject;
    (b) access and/or generate a single vertebra mask that identifies a portion of the graphical representation determined as corresponding to the particular vertebra;
    (c) apply a morphological dilation operation to grow the single vertebra mask, thereby generating a dilated single vertebra mask;
    (d) apply a morphological hole filling operation to the dilated single vertebra mask to fill one or more interior regions within the dilated single vertebra mask to generate the filled single vertebra mask;
    (e) determine a distance map by applying a distance transform to the filled single vertebra mask;
    (f) apply a watershed segmentation operation to the distance map to identify a set of catchment basins from the distance map;
    (g) determine, using the set of catchment basins and the single vertebra mask, a labeled inter-segmented vertebra map comprising a plurality of labeled regions, one of which corresponds to the vertebral centrum; and
    (h) render a graphical representation of the labeled inter-segmented vertebra map.

2. The system of claim 1, wherein, at step (b), the instructions cause the processor to segment the 3D image to generate the single vertebra mask.

3. The system of claim 2, wherein the instructions cause the processor to segment the 3D image by applying one or more second derivative splitting filters to the 3D image.

4. The system of claim 1, wherein, at step (b), the instructions cause the processor to:
    segment the 3D image to generate a labeled bone map comprising a plurality of labeled regions that differentiate portions of the graphical representation corresponding to individual bones;
    render a graphical representation of the labeled bone map;
    receive a user selection of at least one of the plurality of labeled regions; and
    generate the single vertebra mask from the user selected labeled region.

5. The system of claim 1, wherein at least a portion of the single vertebra mask lies on an edge of the 3D image, and wherein the instructions cause the processor to fill an interior of the portion of the single vertebra mask lying on the edge of the 3D image.

6. The system of claim 1, wherein the instructions cause the processor to refine the filled single vertebra mask by performing a morphological erosion operation.

7. The system of claim 1, wherein the instructions cause the processor to perform the morphological dilation operation using a dilation element having a preset and/or automatically determined size based on a resolution of the 3D image.

8. The system of claim 1, wherein the instructions cause the processor to receive a user input of a dilation element size value and use the user input dilation element size in the applying the morphological dilation operation.

9. The system of claim 1, wherein the 3D image of the subject is a CT image.

10. A system for automatically detecting and segmenting a vertebral centrum of a particular vertebra in a 3D image of a subject, the system comprising:
    a processor of a computing device; and
    a memory having instructions stored thereon, wherein the instructions, when executed by the processor, cause the processor to:
    (a) receive a 3D image of a subject, wherein the 3D image comprises a graphical representation of one or more vertebra portions of the subject;
    (b) access and/or generate a single vertebra mask that identifies a portion of the graphical representation determined as corresponding to the particular vertebra;
    (c) apply one or more morphological operations to fill in perforations and/or one or more interior regions of the single vertebra mask, thereby generating a filled single vertebra mask;
    (d) determine a distance map by applying a distance transform to the filled single vertebra mask;
    (e) apply a watershed segmentation operation to the distance map to identify a set of catchment basins from the distance map;
    (f) determine, using the set of catchment basins and the single vertebra mask, a labeled inter-segmented vertebra map comprising a plurality of labeled regions, one of which corresponds to the vertebral centrum;
    (g) render a graphical representation of the labeled inter-segmented vertebra map;
    (h) receive, via a graphical user interface (GUI), a user selection of the labeled region of the inter-segmented vertebra map that corresponds to the vertebral centrum; and
    (i) determine a vertebral centrum region of the inter-segmented vertebra map, the vertebral centrum region corresponding to the user selection.

11. The system of claim 10, wherein the instructions cause the processor to determine one or more morphometric measurements using the determined vertebral centrum region.

12. The system of claim 11, wherein the one or more morphometric measurements comprise measurements of one or more morphometric attributes of a trabecular and/or cortical component of the vertebral centrum.

13. The system of claim 10, wherein, at step (b), the instructions cause the processor to segment the 3D image to generate the single vertebra mask.

14. The system of claim 13, wherein the instructions cause the processor to segment the 3D image by applying one or more second derivative splitting filters to the 3D image.

15. The system of claim 10, wherein, at step (b), the instructions cause the processor to:
    segment the 3D image to generate a labeled bone map comprising a plurality of labeled regions that differentiate portions of the graphical representation corresponding to individual bones;
render a graphical representation of the labeled bone map;
receive a user selection of at least one of the plurality of labeled regions; and
generate the single vertebra mask from the user selected labeled region.

16. The system of claim 10, wherein at least a portion of the single vertebra mask lies on an edge of the 3D image, and wherein the instructions cause the processor to fill an interior of the portion of the single vertebra mask lying on the edge of the 3D image.

17. The system of claim 10, wherein the instructions cause the processor to refine the filled single vertebra mask by performing a morphological erosion operation.

18. The system of claim 17, wherein the instructions cause the processor to perform the morphological erosion operation using an erosion element having a preset and/or automatically determined size based on a resolution of the 3D image.

19. The system of claim 17, wherein the instructions cause the processor to receive a user input of a dilation element size value and using an erosion element having a size value the same as the dilation element size value in applying the morphological erosion operation.

20. The system of claim 10, wherein the 3D image of the subject is a CT image.

* * * * *